(12) United States Patent
Han et al.

(10) Patent No.: US 11,797,143 B2
(45) Date of Patent: Oct. 24, 2023

(54) METHOD FOR CONTROLLING SMALL SCREEN WINDOW AND RELATED DEVICE

(71) Applicant: Huawei Technologies Co., Ltd., Shenzhen (CN)

(72) Inventors: Xiao Han, Shenzhen (CN); Jie Yi, Shenzhen (CN); Long Wang, Shenzhen (CN); Xia Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 34 days.

(21) Appl. No.: 17/623,495

(22) PCT Filed: Jun. 29, 2020

(86) PCT No.: PCT/CN2020/098658
§ 371 (c)(1),
(2) Date: Dec. 28, 2021

(87) PCT Pub. No.: WO2021/000803
PCT Pub. Date: Jan. 7, 2021

(65) Prior Publication Data
US 2022/0261119 A1    Aug. 18, 2022

(30) Foreign Application Priority Data

Jun. 29, 2019  (CN) .......................... 201910581557.1

(51) Int. Cl.
*G06F 3/0481*      (2022.01)
*G06F 3/04883*     (2022.01)

(52) U.S. Cl.
CPC ........ *G06F 3/0481* (2013.01); *G06F 3/04883* (2013.01)

(58) Field of Classification Search
CPC .......................... G06F 3/0481; G06F 3/04883
See application file for complete search history.

(56) References Cited

U.S. PATENT DOCUMENTS 6,970,749 B1    11/2005  Chinn et al.
7,206,029 B2 *   4/2007  Cohen-Solal ...... H04N 21/4316
                                                              348/565
(Continued)

FOREIGN PATENT DOCUMENTS

CN        102194443 A      9/2011
CN        104123065 A     10/2014
(Continued)

*Primary Examiner* — William L Bashore
*Assistant Examiner* — Gregory A Distefano
(74) *Attorney, Agent, or Firm* — SLATER MATSIL, LLP

(57) ABSTRACT

A method for controlling a small screen window includes: determining target blocked information, where the target blocked information includes indication information used to indicate that a target area of a first window is blocked by a second window, and the target area is a display area of a preset feature in the first window; determining a window display instruction based on the target blocked information, where the window display instruction includes an instruction for controlling one or more of a floating position of the second window on the first window, transparency of the second window, a size of the second window, and a shape of the second window; and controlling, according to the window display instruction, the second window to be displayed on the first window.

20 Claims, 18 Drawing Sheets

(56) References Cited

U.S. PATENT DOCUMENTS

| | | | |
|---|---|---|---|
| 7,257,777 B1* | 8/2007 | Kanevsky | G06F 9/451 |
| | | | 715/790 |
| 10,425,679 B2* | 9/2019 | Huang | G06V 40/168 |
| 2002/0075407 A1 | 6/2002 | Cohen-Solal | |
| 2003/0001908 A1* | 1/2003 | Cohen-solal | H04N 21/44218 |
| | | | 348/E5.112 |
| 2007/0050729 A1* | 3/2007 | Kawamura | H04N 7/147 |
| | | | 715/788 |
| 2007/0079322 A1* | 4/2007 | Sloo | H04N 5/44504 |
| | | | 725/19 |
| 2015/0123945 A1 | 5/2015 | Lu | |
| 2015/0271444 A1* | 9/2015 | Defazio | H04N 5/45 |
| | | | 348/14.07 |
| 2016/0066024 A1 | 3/2016 | Gaziel et al. | |
| 2017/0075517 A1* | 3/2017 | Na | G06F 3/04883 |

FOREIGN PATENT DOCUMENTS

| | | |
|---|---|---|
| CN | 104181884 A | 12/2014 |
| CN | 106775372 A | 5/2017 |
| CN | 107506376 A | 12/2017 |
| CN | 108491127 A | 9/2018 |
| CN | 109375983 A | 2/2019 |
| CN | 109814768 A | 5/2019 |
| CN | 110362373 A | 10/2019 |
| CN | 113282962 A | 8/2021 |
| JP | 2004516722 A | 6/2004 |
| JP | 2015129873 A | 7/2015 |

* cited by examiner

A user interface used for a video call

Recognize a user gesture

A user interface on which a second window is controlled to be displayed on a first window after a target gesture is recognized A user interface of an electronic device used to watch a video while making a voice call A user interface on which a user watches a video while making a voice call after the video starts to be played A user interface on which a second window is controlled to be displayed on a first window after a preset feature is recognized A user interface on which a small video window blocks a
face during a multi-party video call in real life A user interface on which a second window is controlled to be displayed on a first window during a multi-party video call in real life A user interface used to make a voice call while playing a game A user interface on which a second window is controlled to be displayed on a first window after a plurality of preset features are recognized A user interface on which a small voice window blocks a game step control when making a voice call while playing a game in real life 409 410 411
A user interface on which a second window is controlled to be displayed on a first window when making a voice call while playing a game in real life A schematic diagram of a scenario in which a second gesture is recognized

METHOD FOR CONTROLLING SMALL SCREEN WINDOW AND RELATED DEVICE

CROSS-REFERENCE TO RELATED APPLICATIONS

This application is a National Stage of International Application No. PCT/CN2020/098658, filed on Jun. 29, 2020, which claims priority to Chinese Patent Application No. 201910581557.1, filed on Jun. 29, 2019, both of which are hereby incorporated by reference in their entireties.

TECHNICAL FIELD

This application relates to the field of electronic device technologies, and in particular, to a method for controlling a small screen window and a related device.

BACKGROUND

With rapid development of the mobile internet, people use mobile phones, tablets, and computers to keep communicating with others anytime at work, at home, on the road, on a trip, and the like. In addition, as network conditions become increasingly mature, people can perform screen splitting for a chat, video, or call interface during communication, so as to perform other operations, for example, scale down the chat, video, or voice interface to a small window and float the small window at a relatively fixed position on an interface during chat, video, or voice communication, so that other content can be displayed on the interface. However, because screen sizes of some electronic devices (for example, mobile phones or tablets) are limited, placing a small window obtained after screen splitting at a fixed position may block display of content in a large window. To avoid affecting content display, currently, a position of the small window is usually changed by performing a slide operation, a button press operation, or the like by a user, so as to display blocked content. For example, when two users make a video call, a small video window of a user of the opposite party is displayed at a fixed position, and this may block a face of a user in a large video window. In this case, the user may move, by touching the screen, the small window to a background area behind the user in the large window, to display the blocked face.

However, during the foregoing video call, if it is inconvenient for the user to operate the mobile phone or the mobile phone may be placed at a position far from the user to release both hands, it is relatively difficult for the user to move the small video window by touching the mobile phone. Therefore, how to enable a user to more conveniently control a small floating window to avoid a special area in a user interface of an electronic device is a problem that urgently needs to be resolved.

SUMMARY

In view of the foregoing problem, this application provides a method for controlling a small screen window and a related device, to overcome the foregoing problem or at least partially resolve the foregoing problem.

According to a first aspect, an embodiment of this application provides a method for controlling a small screen window, and the method may include:

determining target blocked information, where the target blocked information includes indication information used to indicate that a target area of a first window is blocked by a second window, and the target area is a display area of a preset feature in the first window;

determining a window display instruction based on the target blocked information, where the window display instruction includes an instruction for controlling one or more of a floating position of the second window on the first window, transparency of the second window, a size of the second window, and a shape of the second window; and controlling, according to the window display instruction, the second window to be displayed on the first window.

In this embodiment of this application, after determining that the second window blocks the target area of the first window, an electronic device determines the window display instruction based on the target blocked information, and then controls, according to the window display instruction, one or more of the floating position, the transparency, the size, or the shape of the second window, so that when the second window is displayed on the first window, the preset feature in the first window is no longer blocked. For example, in a video call process, when a small video window blocks a face, blocked information indicating that the face is blocked is determined, then a display instruction for moving or scaling down the small video window is determined based on the blocked information, and finally, according to the display instruction, the small video window is automatically moved to an optimal display position and a size of the small video window is reduced. In this process, a user does not need to touch the mobile phone, and excellent video call quality can be achieved. In conclusion, in this embodiment of this application, display of the second window on the first window (which may also be a user interface) is controlled through intelligent recognition and determining. The user does not need to perform a related operation of touching the electronic device, such as touching a screen or pressing a button, and the second window can be more conveniently displayed without affecting a special area in the user interface. This greatly improves user experience.

In a possible implementation, the target blocked information further includes area information of the target area and current window information of the second window. The area information includes one or more of a display area of the preset feature and a display position of the preset feature, and the current window information of the second window includes one or more of current floating position information, current transparency information, current size information, and current shape information of the second window. In this embodiment of this application, the area information of the target area and the current window information of the second window are monitored in real time, so that when the first window blocks the second window, the target blocked information indicating that the target area of the first window is blocked by the second window can be determined in time. This improves accuracy of determining that the first window is blocked by the second window, so that the second window can be displayed without affecting the special area in the user interface, thereby improving user experience.

In a possible implementation, before the determining target blocked information, the method further includes: recognizing the preset feature of the first window, and determining the area information of the target area in which the preset feature is located and the current window information of the second window; determining, based on the area information of the target area and the current window information of the second window, whether the target area meets a blocking condition of being blocked by the second window; and if the target area meets the blocking condition of being blocked by the second window, generating the target blocked information. In this embodiment of this application, after the area information of the target area and the current window information of the second window are monitored, it needs to be determined, based on the monitored information, whether the target area meets the blocking condition of being blocked by the second window, so as to avoid that when no blocking occurs or a blocked situation is relatively short, user experience is poor due to frequent movement of the second window.

In a possible implementation, the blocking condition includes: if a ratio of an overlapping area between the target area and the second window to the display area of the preset feature reaches a preset ratio threshold, determining that the target area is blocked by the second window. In this embodiment of this application, it is determined that the target area of the first window is blocked only when an area of the target area covered by the second window reaches a specific proportion. This avoids moving the second window because the target area is blocked by a small area while user experience is not affected, thereby reducing meaningless operations. For example, during the video call, the small video window blocks hair of the user, and this occupies only 2% of a target area whose preset feature is a portrait. Therefore, video call experience is barely affected, and in this case, display of the small video window on the first window does not need to be controlled, so as to avoid affecting user experience.

In a possible implementation, the blocking condition further includes: if a ratio of an overlapping area between the target area and the second window to the display area of the preset feature reaches a preset ratio threshold, and duration in which the second window and the target area overlap exceeds a preset duration threshold, determining that the target area is blocked by the second window. In this embodiment of this application, it is determined that the target area of the first window is blocked only after an area of the target area covered by the second window reaches a specific proportion and lasts for a period of time, to prevent frequently adjusting display of the second window on the first window after it is determined that the second window blocks the first window when a short time change occurs on a preset feature of the target area, and affecting user experience. For example, during the video call, if the user moves around and frequently moves the small video window, user video experience may be poor.

In a possible implementation, the first window currently has N preset features, where N is an integer greater than or equal to 1. Before the determining target blocked information, the method further includes: recognizing the N preset features of the first window, and determining display priorities respectively corresponding to the N preset features, where a higher display priority of the preset feature indicates a smaller preset ratio threshold corresponding to the preset feature; determining M pieces of area information respectively corresponding to display areas in which M preset features corresponding to the first M display priorities are located in the N preset features and the current window information of the second window, where M is a positive integer less than or equal to N; and determining, based on the M pieces of area information and the current window information of the second window, whether the display areas in which the M preset features are located meet the blocking condition, and if the display areas in which the M preset features are located meet the blocking condition, generating the target blocked information. Optionally, a higher display priority of the preset feature indicates a smaller preset duration threshold corresponding to the preset feature. In other words, a higher display priority of the preset feature indicates a shorter time in which the preset feature is allowed to be blocked by the second window. In this embodiment of this application, when a plurality of preset features are displayed in the first window, display areas of the first several preset features with a high display priority may be first determined as target areas, and then it is determined whether the target areas are blocked. For example, during the video call, it is recognized that the first window includes a preset feature such as a face, a function button (for example, a hang-up button, a mute button, or a switch camera button), and a background (for example, a vase, a wardrobe, or a television). Because according to a preset display priority rule, display priorities of the face and the function button are higher than a display priority of the background, it may be considered that the target area is not blocked when the second window blocks the background. When the second window blocks the face or the function button, it is considered that the second window blocks the target area. To be specific, in this embodiment of this application, the display areas of the first several preset features with a high display priority are preferably determined as the target areas, so that a case in which whether the second window blocks the first window cannot be accurately and effectively determined when the plurality of preset features appear at the same time can be reduced. In addition, it can be more effectively recognized whether the second window blocks a preset feature that is more "important" for the user. This improves user experience.

In a possible implementation, the determining a window display instruction based on the target blocked information includes: determining the window display instruction based on the target blocked information and a display condition of the second window. The display condition includes floating the second window on a display area of a preset feature with a lowest display priority in all the preset features of the first window. Alternatively, the display condition includes floating the second window on a display area that is of the first window except the display area of the preset feature and that is closest to a camera. Alternatively, the display condition includes floating the second window on a display area that is of the first window except the display area of the preset feature and that has a largest display area. In this embodiment of this application, the window display instruction is determined based on the target blocked information and the display condition of the second window, so that the window display instruction can better control the second window to be displayed on the first window, and more conveniently and efficiently control the second window to avoid the special area in the user interface of the electronic device. This improves user experience. For example, the second window may preferably avoid the preset feature with a high display priority, and is displayed in a display area of a preset feature with a relatively low priority. For another example, when there are two display areas that can be displayed on the user interface at the same time, one of the two display areas is relatively close to a location of the camera, and the other is relatively far from the location of the camera, the second window may avoid the display area that is relatively far from the camera, and is preferably displayed in the display area that is relatively close to the camera. For another example, when there are two display areas that can be displayed on the user interface at the same time, and a display area of one display area is smaller than a display area of the other display area, the second window may avoid the display area with a smaller display area, and is preferably displayed in the display area with a larger display area.

In a possible implementation, before the determining target blocked information, the method further includes: recognizing a first gesture, and determining whether the first gesture is one of a first preset gesture set; and if it is determined that the first gesture is one of the first preset gesture set, generating the target blocked information. The determining a window display instruction based on the target blocked information includes: determining, based on the first gesture and a correspondence between a preset gesture and a preset window display instruction, the window display instruction corresponding to the first gesture, where the window display instruction is one of a plurality of preset window display instructions. In this embodiment of this application, the electronic device may further recognize a user gesture by using an apparatus such as a camera or a gesture recognition sensor, determine that the user gesture is one of the first preset gesture set, and then determine the window display instruction based on the user gesture, so as to control the second window to be displayed on the first window. In this way, the user does not need to touch the screen of the device, and can flexibly control the second window by using an air gesture. This frees hands of the user, and improves user experience.

In a possible implementation, the recognizing a first gesture includes: recognizing one or more of gesture duration information, gesture motion track information, and gesture shape information of the first gesture. In this embodiment of this application, two gestures with different information in any one of gesture duration information, gesture motion track information, gesture shape information, and the like may be considered as different gestures. Therefore, to prevent incorrect display control caused by incorrect recognition of the user gesture, accurate control may be implemented by recognizing different information of various aspects of the gesture, so as to avoid a case in which the second window cannot be controlled to be displayed on the first window according to the user's intention because the user gesture is incorrectly recognized.

In a possible implementation, the method further includes: recognizing a second gesture, and determining whether the second gesture is one of a second preset gesture set, where the second preset gesture set is a gesture set for controlling one or more function buttons in the first window; if the second gesture is one of the second preset gesture set, determining a button control instruction based on the second gesture and a correspondence between a preset gesture in the second preset gesture set and a function button; and controlling, according to the button control instruction, a target function button in the first window to perform a corresponding function. It may be understood that the target function button is a function button corresponding to the second gesture. In this embodiment of this application, the electronic device may further recognize a user gesture by using an apparatus such as a camera or a gesture recognition sensor, determine that the user gesture is one of the second preset gesture set, and then determine the button control instruction based on the user gesture, so as to control the target function button in the first window to perform the corresponding function. In this way, the user does not need to touch the screen of the device, and can flexibly control the function button by using an air gesture. This frees hands of the user, and improves user experience.

In a possible implementation, the recognizing a second gesture includes: recognizing one or more of gesture duration information, gesture motion track information, and gesture shape information of the second gesture. In this embodiment of this application, two gestures with different information in any one of gesture duration information, gesture motion track information, gesture shape information, and the like may be considered as different gestures. Therefore, to prevent incorrect control caused by incorrect recognition of the user gesture, accurate control may be implemented by recognizing different information of various aspects of the gesture, so as to avoid a case in which the function button in the first window cannot be controlled according to the user's intention because the user gesture is incorrectly recognized.

According to a second aspect, an embodiment of this application provides an electronic device, and the electronic device may include one or more processors, a memory, and one or more buttons.

The memory, a display, and the one or more buttons are coupled to the one or more processors, the memory is configured to store computer program code, the computer program code includes computer instructions, and the one or more processors execute the computer instructions to perform the following operations:

determining target blocked information, where the target blocked information includes indication information used to indicate that a target area of a first window is blocked by a second window, and the target area is a display area of a preset feature in the first window;

determining a window display instruction based on the target blocked information, where the window display instruction includes an instruction for controlling one or more of a floating position of the second window on the first window, transparency of the second window, a size of the second window, and a shape of the second window; and controlling, according to the window display instruction, the second window to be displayed on the first window.

In a possible implementation, the target blocked information further includes area information of the target area and current window information of the second window. The area information includes one or more of a display area of the preset feature and a display position of the preset feature, and the current window information of the second window includes one or more of current floating position information, current transparency information, current size information, and current shape information of the second window.

In a possible implementation, before the processor is configured to determine the target blocked information, the processor is further configured to: recognize the preset feature of the first window, and determine the area information of the target area in which the preset feature is located and the current window information of the second window; determine, based on the area information of the target area and the current window information of the second window, whether the target area meets a blocking condition of being blocked by the second window; and if the target area meets the blocking condition of being blocked by the second window, generate the target blocked information.

In a possible implementation, the blocking condition includes: if a ratio of an overlapping area between the target area and the second window to the display area of the preset feature reaches a preset ratio threshold, determining that the target area is blocked by the second window.

In a possible implementation, the blocking condition further includes: if a ratio of an overlapping area between the target area and the second window to the display area of the preset feature reaches a preset ratio threshold, and duration in which the second window and the target area overlap exceeds a preset duration threshold, determining that the target area is blocked by the second window.

In a possible implementation, the first window currently has N preset features, where N is an integer greater than or equal to 1. Before the processor is configured to determine the target blocked information, the processor is further configured to: recognize the N preset features of the first window, and determine display priorities respectively corresponding to the N preset features, where a higher display priority of the preset feature indicates a smaller preset ratio threshold corresponding to the preset feature; determine M pieces of area information respectively corresponding to display areas in which M preset features corresponding to the first M display priorities are located in the N preset features and the current window information of the second window, where M is a positive integer less than or equal to N; and determine, based on the M pieces of area information and the current window information of the second window, whether the display areas in which the M preset features are located meet the blocking condition, and if the display areas in which the M preset features are located meet the blocking condition, generate the target blocked information.

In a possible implementation, when the processor is configured to determine the window display instruction based on the target blocked information, the processor is specifically configured to: determine the window display instruction based on the target blocked information and a display condition of the second window. The display condition includes floating the second window on a display area of a preset feature with a lowest display priority in all the preset features of the first window. Alternatively, the display condition includes floating the second window on a display area that is of the first window except the display area of the preset feature and that is closest to a camera. Alternatively, the display condition includes floating the second window on a display area that is of the first window except the display area of the preset feature and that has a largest display area.

In a possible implementation, before the processor is configured to determine the target blocked information, the processor is further configured to: recognize a first gesture, and determine whether the first gesture is one of a first preset gesture set; and if it is determined that the first gesture is one of the first preset gesture set, generate the target blocked information. When the processor is configured to determine the window display instruction based on the target blocked information, the processor is specifically configured to: determine, based on the first gesture and a correspondence between a preset gesture and a preset window display instruction, the window display instruction corresponding to the first gesture, where the window display instruction is one of a plurality of preset window display instructions.

In a possible implementation, when the processor recognizes the first gesture, the processor is specifically configured to: recognize one or more of gesture duration information, gesture motion track information, and gesture shape information of the first gesture.

In a possible implementation, the processor is further configured to: recognize a second gesture, and determine whether the second gesture is one of a second preset gesture set, where the second preset gesture set is a gesture set for controlling one or more function buttons in the first window; if the second gesture is one of the second preset gesture set, determine a button control instruction based on the second gesture and a correspondence between a preset gesture in the second preset gesture set and a function button; and control, according to the button control instruction, a target function button in the first window to perform a corresponding function.

In a possible implementation, when the processor recognizes the second gesture, the processor is specifically configured to: recognize one or more of gesture duration information, gesture motion track information, and gesture shape information of the first gesture.

According to a third aspect, an embodiment of this application provides a computer storage medium, including computer instructions. When the computer instructions are run on an electronic device, the electronic device is enabled to perform the method for controlling a small screen window provided in any one of the first aspect or the implementations of the first aspect according to the embodiments of this application.

According to a fourth aspect, an embodiment of this application provides a computer program product. When the computer program product runs on an electronic device, the electronic device is enabled to perform the method for controlling a small screen window provided in any one of the first aspect or the implementations of the first aspect according to the embodiments of this application.

It may be understood that the electronic device provided in the second aspect, the computer storage medium provided in the third aspect, and the computer program product provided in the fourth aspect are all configured to perform the method for controlling a small screen window provided in the first aspect. Therefore, for beneficial effects that can be achieved, refer to beneficial effects in the photographing method provided in the second aspect. Details are not described herein again.

BRIEF DESCRIPTION OF THE DRAWINGS

To describe technical solutions in embodiments of this application or in the background more clearly, the following describes the accompanying drawings for describing the embodiments of this application or the background.

DETAILED DESCRIPTION OF ILLUSTRATIVE EMBODIMENTS

Figure 1A:
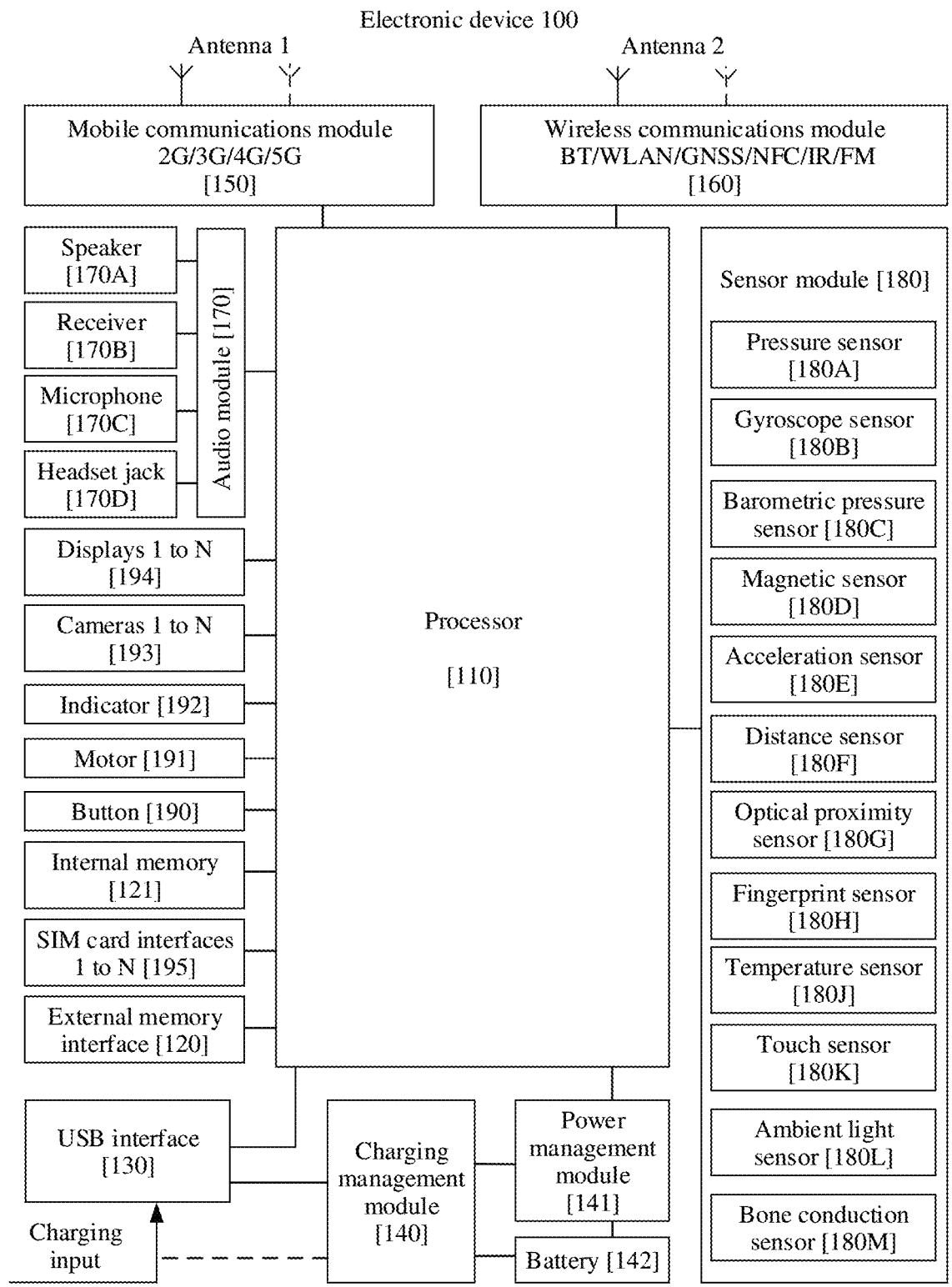
FIG. 1A is a schematic diagram of a structure of an electronic device 100 according to an embodiment of this application.

The following describes embodiments of this application with reference to the accompanying drawings in the embodiments of this application.

In the specification, claims, and accompanying drawings of this application, terms "first", "second", and the like are intended to distinguish between different objects but do not indicate a particular order. In addition, terms "include", "have", and any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in the specification means that a particular characteristic, structure, or feature described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by persons skilled in the art that the embodiments described in the specification may be combined with another embodiment.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed from various computer-readable media that store various data structures. The components may communicate, by using a local and/or remote process and based on, for example, a signal having one or more data packets (for example, data from two components interacting with another component in a local system, in a distributed system, and/or across a network such as the internet interacting with another system by using the signal).

The term "user interface (user interface, UI)" in the specification, claims, and accompanying drawings of this application is a medium interface for interaction and information exchange between an application or an operating system and a user, and implements conversion between an internal form of information and a form that can be accepted by the user. A user interface of an application is source code compiled in a specific computer language such as Java or an extensible markup language (extensible markup language, XML). The interface source code is parsed and rendered on a terminal device, and is finally presented as content that can be identified by the user, for example, a control such as an image, a text, or a button. The control (control) is also referred to as a widget (widget), and is a basic element of the user interface. Typical controls include a toolbar (toolbar), a menu bar (menu bar), a text box (text box), a button (button), a scrollbar (scrollbar), an image, and a text. An attribute and content of a control on an interface are defined by using a tag or a node. For example, the XML defines, by using a node such as <Textview>, <ImgView>, or <VideoView>, the control included on the interface. One node corresponds to one control or attribute on the interface. After being parsed and rendered, the node is presented as content visible to the user. In addition, interfaces of a plurality of applications such as a hybrid application (hybrid application) usually further include a web page. The web page is also referred to as a page, and may be understood as a special control embedded into an interface of an application. The web page is source code compiled in a specific computer language such as a hypertext markup language (hypertext markup language, HTML), a cascading style sheet (cascading style sheet, CSS), or JavaScript (JavaScript, JS). A browser or a web page display component whose function is similar to that of the browser may load and display the web page source code as content that can be identified by the user. Specific content included in the web page is also defined by using a label or a node in the web page source code. For example, in GTML, an element and an attribute of the web page is defined by using <p>, <img>, <video>, or <canvas>.

The user interface is usually represented in a form of a graphical user interface (graphic user interface, GUI), which is a user interface that is related to a computer operation and that is displayed in a graphical manner. The user interface may be an interface element such as an icon, a window, or a control displayed in a display of an electronic device. The control may include a visible interface element such as an icon, a button, a menu, a tab, a text box, a dialog box, a status bar, a navigation bar, or a widget.

Some terms in this application are first described, to help persons skilled in the art have a better understanding.

(1) Window: The window is a most important part of a user interface. The window is a rectangular area on a screen corresponding to an application, includes a frame and a client area, and is a visual interface between a user and an application that generates the window. Each time the user starts to run an application, the application creates and displays a window. When the user performs an operation on an object in the window, the program reacts accordingly. The user terminates a program by closing a window, and selects a corresponding application by selecting a corresponding application window.

(2) Video call: The video call is a communication mode in which images of both parties in the call can be viewed in real time, and has two modes: VoIP video call and carrier video call.

(3) Small video window: Usually, during a video call, to better view a peer image, the peer image is displayed in a large full-screen window by default, and a local image is displayed in a smaller window floating on the large window. Switching between the large window and the small window can be implemented by tapping the small window, and a position of the small window can be changed by dragging the small window. The small video window in this application refers to the small window floating on the large full-screen window.

(4) Gesture recognition: Gesture recognition aims to recognize a physical motion or "gesture" of a human, and may be based on recognizing a human motion as an input form. Gesture recognition is also classified as a non-contact user interface. Different from a touchscreen device, a device with a non-contact user interface can be controlled without touching. The device may have one or more sensors or cameras that can monitor a movement of the user. When the device detects a movement corresponding to a command, the device responds with an appropriate output. For example, when the device detects hand waving in a particular pattern in front of the device, the device may start a particular application.

(5) Gesture tracking sensor: The gesture tracking sensor is a sensor that uses an optical fiber sensor to track a movement of a finger.

The following describes an example of an electronic device provided in the following embodiments of this application.

FIG. 1A is a schematic diagram of a structure of an electronic device 100 according to an embodiment of this application. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in the embodiments of this application does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store an instruction and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between modules illustrated in this embodiment of this application is merely an example for description, and does not constitute a limitation on the structure of the electronic device 100. In some other embodiments of this application, the electronic device 100 may alternatively use an interface connection manner different from an interface connection manner in this embodiment, or a combination of a plurality of interface connection manners.

The charging management module 140 is configured to receive a charging input from a charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave by using the antenna 1 for radiation. In some embodiments, at least some function modules of the mobile communications module 150 may be disposed in the processor 110. In some embodiments, at least some function modules of the mobile communications module 150 may be disposed in a same device as at least some modules of the processor 110.

The modem processor may include a modulator and a demodulator. In some embodiments, the modem processor may be an independent device. In some other embodiments, the modem processor may be independent of the processor 110, and is disposed in a same device as the mobile communications module 150 or another function module.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communications module 160 may be one or more components integrating at least one communication processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave by using the antenna 2 for radiation.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or satellite based augmentation systems (satellite based augmentation systems, SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a mini LED, a micro LED, a micro-OLED, quantum dot light emitting diodes (quantum dot light emitting diodes, QLED), or the like. In some embodiments, the electronic device 100 may include one or N displays 194, where N is a positive integer greater than 1.

The electronic device 100 may implement a shooting function through the ISP, the camera 193, the video codec, the GPU, the display 194, the application processor, and the like.

The ISP is configured to process data fed back by the camera 193. For example, during shooting, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated by using the lens, and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to: compress or decompress a digital video. The electronic device 100 may support one or more video codecs. Therefore, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. The NPU can implement applications such as intelligent cognition of the electronic device 100, such as image recognition, facial recognition, speech recognition, and text understanding.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a sound playing function or an image playing function), and the like. The data storage area may store data (for example, audio data, and a phone book) created in a process of using the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "horn", is configured to convert an electrical audio signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or audio information is listened to by using the electronic device 100, the receiver 170B may be put close to a human ear to listen to a voice.

The microphone 170C, also referred to as a "mike" or a "microphone", is configured to convert a sound signal into an electrical signal. When making a call or sending voice information, a user may make a sound close to the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change of the capacitance. When a touch operation is performed on the display 194, the electronic device 100 detects intensity of the touch operation by using the pressure sensor 180A. The electronic device 100 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating an SMS message is executed.

The gyroscope sensor 180B may be configured to determine a motion posture of the electronic device 100.

The barometric pressure sensor 180C is configured to measure barometric pressure.

The magnetic sensor 180D includes a Hall effect sensor.

The acceleration sensor 180E may detect magnitude of accelerations in various directions (usually on three axes) of the electronic device 100, and may detect a magnitude and a direction of gravity when the electronic device 100 is still. The acceleration sensor 180E may be further configured to identify a posture of the electronic device, and is used in an application such as switching between a landscape mode and a portrait mode or a pedometer.

The distance sensor 180F is configured to measure a distance.

The optical proximity sensor 180G may include, for example, a light-emitting diode (LED) and an optical detector such as a photodiode.

The ambient light sensor 180L is configured to sense ambient light brightness.

The fingerprint sensor 180H is configured to collect a fingerprint. The electronic device 100 may use a feature of the collected fingerprint to implement fingerprint-based unlocking, application lock access, fingerprint-based shooting, fingerprint-based call answering, and the like.

The temperature sensor 180J is configured to detect a temperature. In some embodiments, the electronic device 100 executes a temperature processing policy based on the temperature detected by the temperature sensor 180J.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of the touch event. A visual output related to the touch operation may be provided by using the display 194. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, and receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to produce an incoming call vibration prompt and a touch vibration feedback. For example, touch operations performed on different applications (for example, shooting and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type, or may be of different types. The SIM card interface 195 may be compatible with different types of SIM cards. The SIM card interface 195 may be further compatible with the external memory card. The electronic device 100 interacts with a network through the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

Figure 1B:
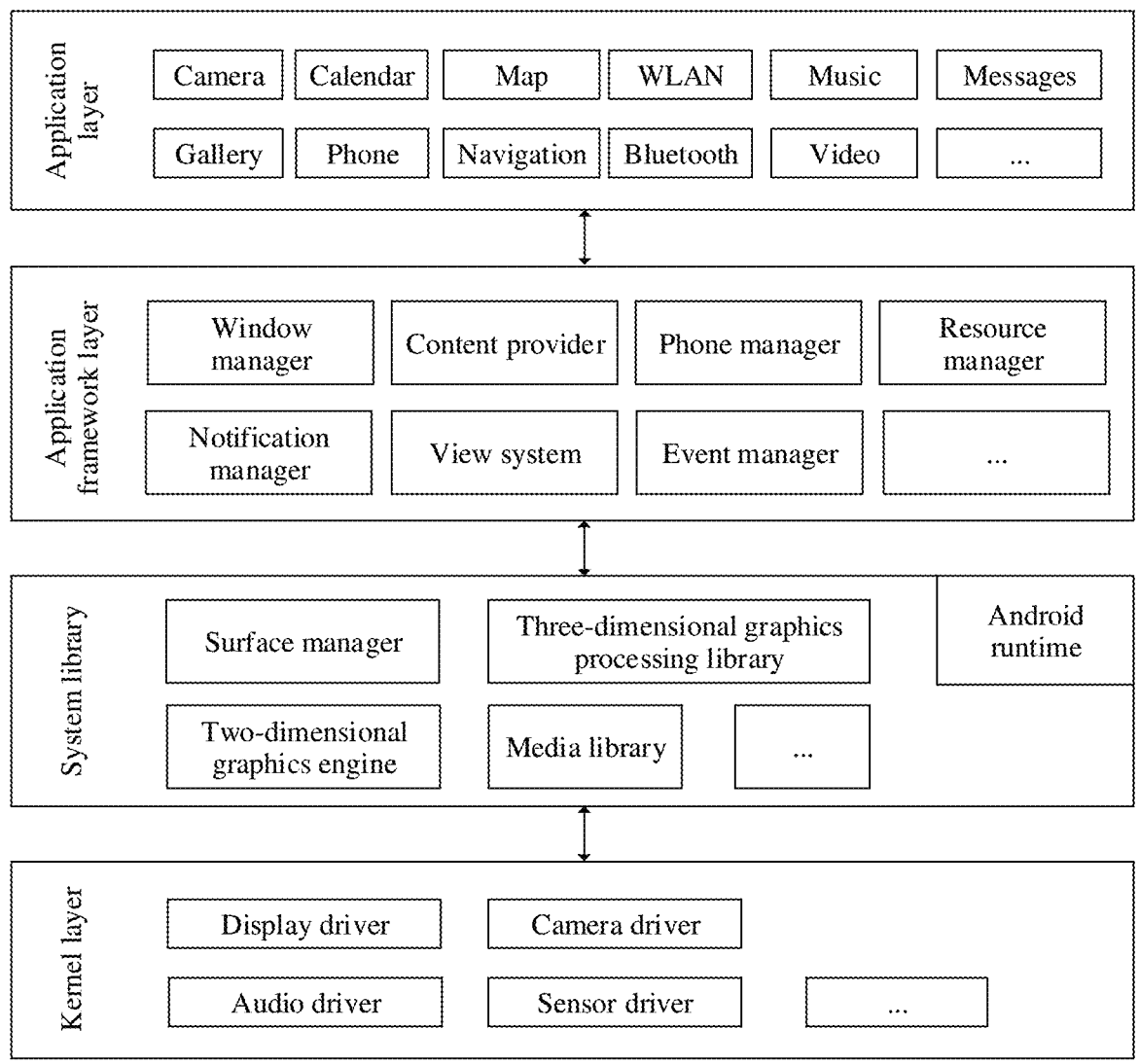
FIG. 1B is a block diagram of a software structure of an electronic device 100 according to an embodiment of this application.

A software system of the electronic device 100 may use a layered architecture, an event-driven architecture, a microkernel architecture, a micro service architecture, or a cloud architecture. In the embodiments of this application, an Android system with a layered architecture is used as an example to describe a software structure of the electronic device 100. FIG. 1B is a block diagram of a software structure of an electronic device 100 according to an embodiment of this application.

It may be understood that the block diagram of the software structure shown in this embodiment of this application constitutes no specific limitation on the block diagram of the software structure of the electronic device 100.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 1B, the application package may include applications such as "camera", "gallery", "calendar", "phone", "map", "navigation", "WLAN", "Bluetooth", "music", "video", and "messages".

The application framework layer provides an application programming interface (application programming interface, API) and a programming framework for an application at the application layer. The application framework layer includes some predefined functions.

As shown in FIG. 1B, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a message notification icon may include a text display view and a picture display view.

The phone manager is configured to provide a communication function of the electronic device 100, for example, management of a call status (including answering or declining a call).

The resource manager provides various resources for an application, such as a localized character string, an icon, a picture, a layout file, and a video file.

The notification manager enables an application to display notification information in a status bar, and may be configured to convey a notification type message. The notification manager may automatically disappear after a short pause without user interaction. For example, the notification manager is configured to provide notifications of download completing, a message prompt, and the like. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an alert sound is played, the electronic device vibrates, or the indicator light blinks.

The Android runtime includes a kernel library and a virtual machine. The Android runtime is responsible for scheduling and management of the Android system.

The kernel library includes two parts: one part is a function that needs to be invoked by a Java language, and the other part is a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Library), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording of a plurality of commonly used audio and video formats, static image files, and the like. The media library may support a plurality of audio and video coding formats, such as MPEG-4, G.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The software system shown in FIG. 1B relates to an application presentation (such as a gallery or a file manager) that uses a sharing capability, an instant sharing module that provides the sharing capability, a print service (print service) that provides a printing capability, and a print spooler (print spooler). In addition, the application framework layer provides a printing framework, a WLAN service, and a Bluetooth service, and the bottom kernel layer provides a WLAN Bluetooth capability and a basic communications protocol.

The following describes examples of working procedures of software and hardware of the electronic device 100 with reference to a photographing scenario.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. An example in which the touch operation is a touch operation, and a control corresponding to the touch operation is a control of a camera application icon is used. The camera application invokes an interface of the application program framework layer to enable the camera application, then enables the camera driver by invoking the kernel layer, and captures a static image or a video by using the 3D camera module 193.

It may be understood that the electronic device in this application may be a device that is at the outermost periphery of the network in a computer network, or may be configured to input information, output a processing result, and the like, or may be referred to as a remote terminal, a mobile device, a user terminal, a mobile terminal, a wireless communications device, a service device with a communication function, or user equipment (User Equipment, UE). For example, the electronic device may be a cellular phone, a mobile phone, a cordless phone, a smartwatch, a wearable device (Wearable Device), a tablet device, a telephone software terminal (for example, a telephone software terminal of an IP softphone module or a program application, where one of the types may be a SIP (Session Initiation Protocol)-based telephone, namely, session initiation protocol telephone developed by a SIP), a communicable smart television, a wireless local loop (Wireless Local Loop, WLL) station, a personal digital assistant (Personal Digital Assistant, PDA), a handheld device having a wireless communication function, a computing device, an in-vehicle communications module, a smart meter, or another processing device connected to a wireless modem.

The following describes several application scenarios and user interface (user interface, UI) embodiments in the several application scenarios according to this embodiment of this application. It should be noted that the user interface mentioned in this embodiment of this application may be understood as a first window in this application, and a small video window, a small voice window, a small floating window, or the like mentioned in this embodiment of this application may be understood as a second window in this application.

Scenario 1: Video call scenario (Control the second window by using a first gesture.)

Figure 2:
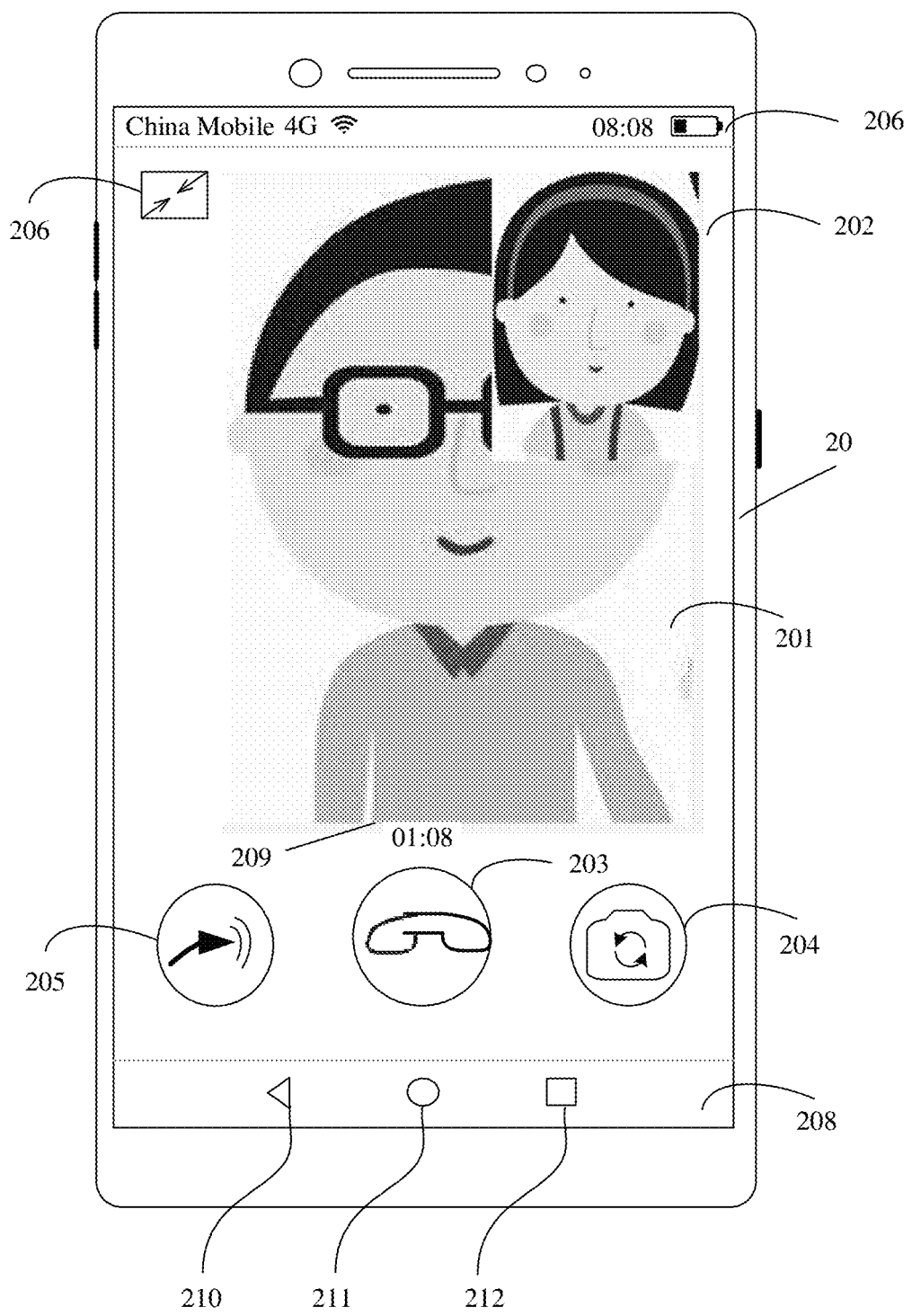
FIG. 2 is a user interface used for a video call according to an embodiment of this application.

FIG. 2 is a user interface used for a video call according to an embodiment of this application. The user interface may be a video call interface provided by WeChat or Apple's Face Time interface. Not limited thereto, the user interface may alternatively be a video call interface provided by another application, and the another application may be, for example, instant messaging software such as QQ or MSN. During a video call, the small video window is generally located in the upper right corner by default. In QQ, the small video window is located in the lower right corner by default because the upper right corner has another function.

As shown in FIG. 2, a user interface 20 used for a video call may include: a video display area 201, a window switching control 202, a hang-up control 203, a camera switching control 204, a voice switching control 205, a window scale-down control 206, a status bar 207, a navigation bar 208, and a call duration indicator 209. An electronic device used by a local user is the electronic device 100.

The video display area 201 is used to display an image collected by a camera of an electronic device (or the electronic device 100) of a video contact.

The window switching control 202 is used to display an image collected by a camera of the electronic device 100 (or the electronic device of the video contact), or may be used to switch a video window. The electronic device 100 may detect a touch operation performed on the window switching control 202 (for example, a tap operation on the window switching control 202). In response to the operation, the electronic device 100 may switch an image displayed in the video display area 201 and an image displayed in the window switching control 202.

For example, if the video display area 201 displays the image collected by the camera of the electronic device of the video contact, the window switching control 202 displays the image collected by the camera 193 of the electronic device 100. After the electronic device 100 detects the touch operation performed on the window switching control 202, in response to the operation, the electronic device 100 switches content displayed in the video display area 201 to the image collected by the camera 193 of the electronic device 100, and simultaneously switches content displayed in the window switching control 202 to the image collected by the camera of the electronic device of the video contact.

Conversely, if the video display area 201 displays the image collected by the camera 193 of the electronic device 100, the window switching control 202 displays the image collected by the camera of the electronic device of the video contact. After the electronic device 100 detects the touch operation performed on the window switching control 202, in response to the operation, the electronic device 100 switches content displayed in the video display area 201 to the image collected by the camera of the electronic device of the video contact, and simultaneously switches content displayed in the window switching control 202 to the image collected by the camera 193 of the electronic device 100.

The hang-up control 203 is used to disconnect the video call. The electronic device 100 may detect a touch operation performed on the hang-up control 203 (for example, a tap operation on the hang-up control 203). In response to the operation, the electronic device 100 may disconnect the video call.

The camera switching control 204 is used to switch between cameras. The electronic device 100 may detect a touch operation performed on the camera switching control 204 (for example, a tap operation on the camera switching control 204). In response to the operation, the electronic device 100 may switch between cameras. For example, the camera of the electronic device 100 is switched from a front-facing camera to a rear-facing camera, or the camera of the electronic device 100 is switched from a rear-facing camera to a front-facing camera.

The voice switching control 205 is used to switch the video call to a voice call. The electronic device 100 may detect a touch operation performed on the voice switching control 205 (for example, a tap operation on the voice switching control 205). In response to the operation, the electronic device 100 may switch the video call to a voice call, and turn off the camera 193.

The window scale-down control 206 is used to scale down the window. The electronic device 100 may detect a touch operation performed on the window scale-down control 206 (for example, a tap operation on the window scale-down control 206). In response to the operation, the electronic device 100 may scale down a current video window, and display, in the scaled-down window, the image collected by the camera of the electronic device of the video contact.

The status bar 207 may include an operator indicator (for example, an operator name "China Mobile"), one or more signal strength indicators of a wireless fidelity (wireless fidelity, Wi-Fi) signal, one or more signal strength indicators of a mobile communication signal (also referred to as a cellular signal), a time indicator, and a battery status indicator.

The navigation bar 208 may include system navigation buttons such as a back button 210, a home screen (Home screen) button 211, and a historical call-out task button 212. The home screen is an interface displayed by the electronic device 100 after a user operation performed on the home screen button 207 is detected in any user interface. When detecting that the user taps the back button 210, the electronic device 100 may display a previous user interface of a current user interface. When detecting that the user taps the home screen button 211, the electronic device 100 may display the home screen. When detecting that the user taps the historical call-out task button 212, the electronic device 100 may display a task recently opened by the user. The navigation buttons may alternatively have other names. For example, 210 may be referred to as a back button, 211 may be referred to as a home button, and 212 may be referred to as a menu button. This is not limited in this application. The navigation buttons in the navigation bar 208 are not limited to virtual buttons, and may alternatively be implemented as physical buttons. In some possible embodiments, the system navigation buttons such as the back button 210, the home screen (Home screen) button 211, and the historical call-out task button 212 may also be referred to as a second control.

The call duration indicator 209 is used to indicate duration of a current video call.

In this scenario, in a video call process of the user, the video display area 202 may block video image information (for example, a face or a target object) in the video display area 201. In this case, if it is inconvenient for the user to operate the mobile phone due to relatively slippery or dirty hands, or if the user places the mobile phone at a position relatively far from a person to enable the camera 193 of the electronic device 100 to collect an image in a wider range, it is relatively difficult for the user to move the small video window by touching the mobile phone, thereby causing poor video call experience. The foregoing examples list several video call scenarios in which inconvenient operations cause poor video call experience.

Based on the foregoing video call scenario, the following describes some UI embodiments implemented on the electronic device 100.

When the window switching control 202 (that is, the second window) blocks a target area of the video display area 201 (that is, the first window), because it is inconvenient for the user to directly control the mobile phone, the electronic device 100 may determine target blocked information by recognizing the first gesture, then determine a window display instruction based on the determined target blocked information, and finally control, according to the window display instruction, the window switching control 202 to be displayed on the video display area 201.

The following provides a detailed description from the following aspects.

(1) How to Determine the Target Blocked Information.

Figure 3:
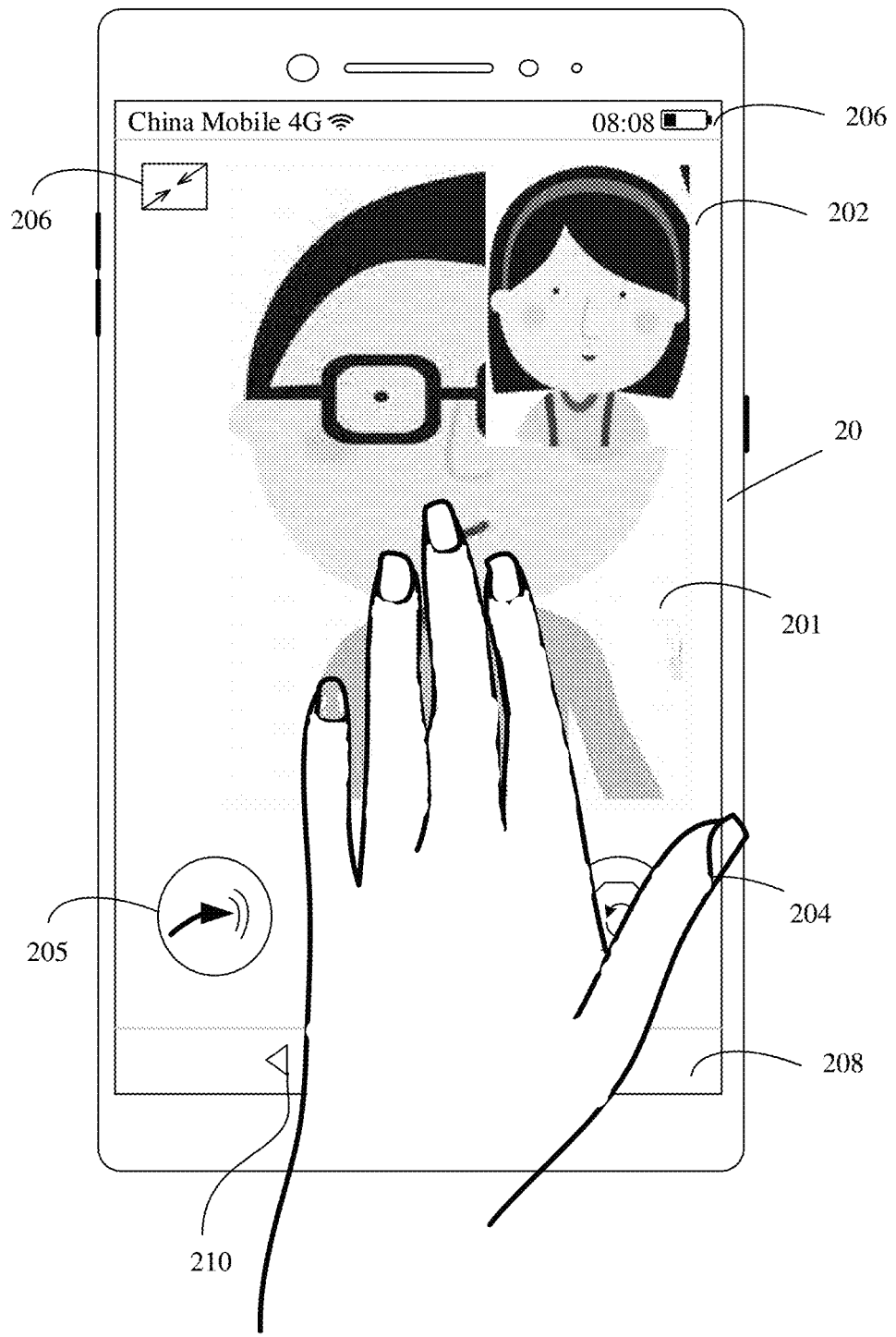
FIG. 3 is a schematic diagram of a user operation performed when a first gesture is recognized according to an embodiment of this application.

FIG. 3 is a schematic diagram of a user operation performed when the first gesture is recognized according to this embodiment of this application.

As shown in FIG. 3, the electronic device 100 may detect a gesture operation of the user by using the camera 193 (for example, the user makes a five-finger slightly splay gesture in front of the camera 193). In response to the gesture operation, the electronic device 100 may recognize the gesture. The gesture operation is not limited to making only the five-finger slightly splay gesture in front of the camera 193. Different gesture operations may be further represented by changing gesture staying duration in front of the camera, a gesture motion track, and a gesture shape.

Figure 4:
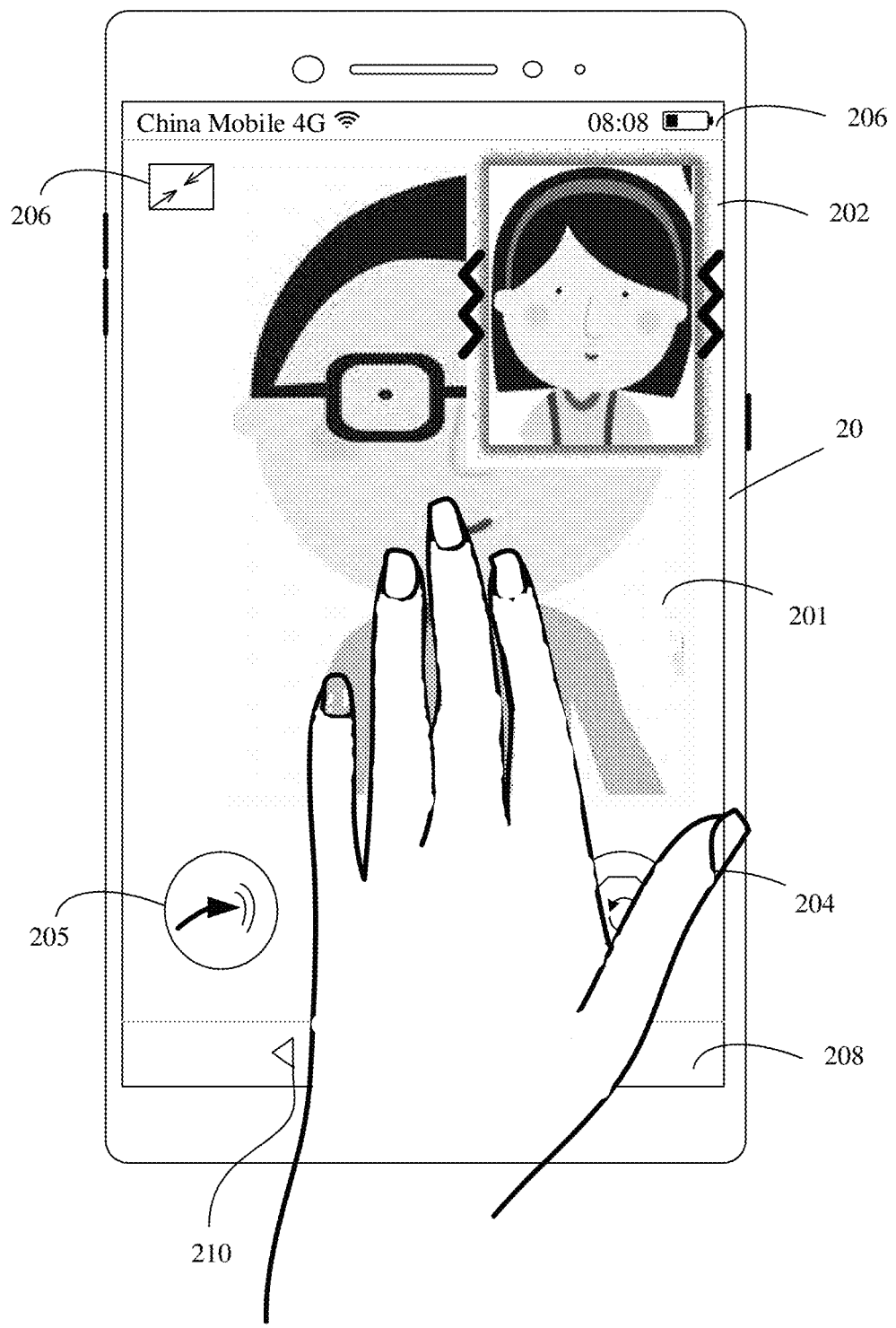
FIG. 4 is a user interface when a camera 193 detects that a user gesture is one of a first preset gesture set according to an embodiment of this application.

In specific implementation, when the camera 193 detects gestures of the user, different gesture staying duration, gesture motion tracks, gesture shapes such as five-finger splay and five-finger fist, and left-right movement and back-and-forth movement of the gesture may generate different optical and/or acoustic effects, and generate corresponding signals (including an acceleration value generated by the gesture operation for a terminal). The signals generated by the different gestures may be captured by a sensor (for example, a gesture recognition sensor, an acceleration sensor, a shock sensor, a vibration sensor, an acoustic sensor, a displacement sensor, or a speed sensor) of the electronic device 100. Therefore, the electronic device 100 may distinguish, by using the captured signal, a specific gesture used by the user, and then determine whether the user gesture detected by the camera 193 is one of a first preset gesture set, or determine whether the user gesture detected by the camera 193 is one of a second preset gesture set. If it is determined that the user gesture detected by the camera 193 is one of the first preset gesture set, the target blocked information is generated. In this case, the electronic device 100 may indicate, through vibration and/or by using a user interface identifier (for example, the small video window shines, the border is thickened or shadowed), that the user gesture detected by the camera 193 is one of the first preset gesture set. The target blocked information includes indication information used to indicate that the target area of the video display area 201 is blocked by the window switching control 202. The target blocked information further includes area information of the target area and current window information of the window switching control 202. The area information includes one or more of a display area of the preset feature and a display position of the preset feature, and the current window information of the window switching control 202 includes one or more of current floating position information, current transparency information, current size information, and current shape information of the window switching control 202. FIG. 4 is a user interface when the camera 193 detects that the user gesture is one of the first preset gesture set according to this embodiment of this application. When the camera 193 detects that the user gesture is one of the first preset gesture set, the window switching control 202 may shine or vibrate, or the electronic device vibrates, to indicate that the user gesture is one of the first preset gesture set.

It is not limited to the foregoing listed user operation of recognizing the first gesture by using the camera 193. In specific implementation, there may be another manner of recognizing the user operation. For example, the electronic device 100 may further recognize the gesture operation of the user by using an infrared sensor.

It is not limited to the foregoing listed user operation of recognizing the first gesture. In specific implementation, there may be another form of user operation to determine the target blocked information, for example, voice control. This is not limited in this embodiment of this application.

(2) How to Determine the Window Display Instruction.

Figure 5:
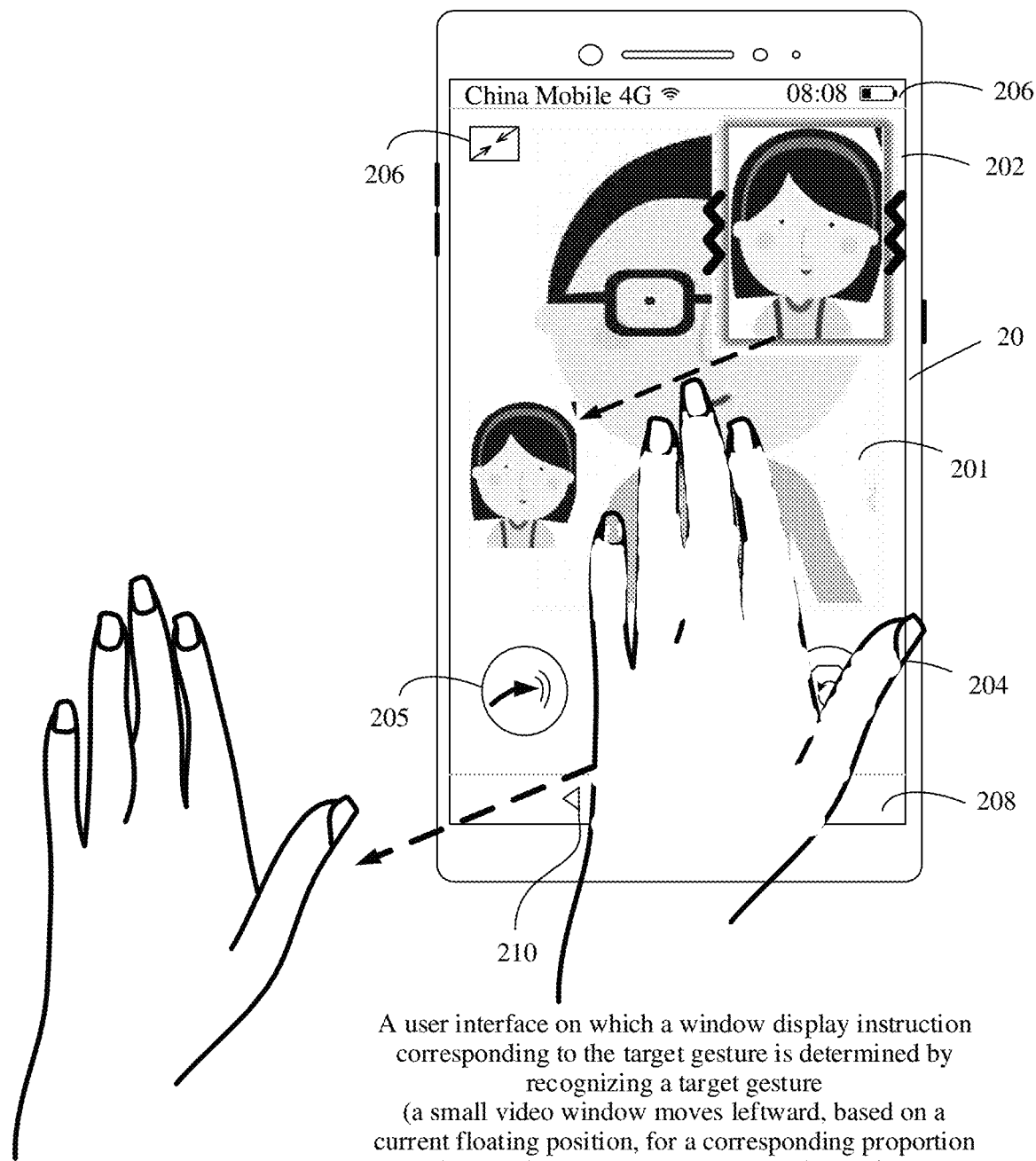
FIG. 5 is a user interface on which a window display instruction corresponding to the first gesture according to an embodiment of this application is determined by recognizing a first gesture.

FIG. 5 is a user interface on which the window display instruction corresponding to the first gesture according to this embodiment of this application is determined by recognizing the first gesture.

As shown in FIG. 5, in response to the gesture operation performed on the camera 193 in the embodiment corresponding to FIG. 2, the electronic device 100 may recognize one or more of gesture duration information, gesture motion track information, and gesture shape information of the first gesture to determine that the user gesture detected by the camera 193 is one of the first preset gesture set, and then determine, based on the user gesture detected by the camera 193 and a correspondence between the preset gesture and a preset window display instruction, the window display instruction corresponding to the user gesture detected by the camera 193. In this case, the electronic device 100 may display, in real time, an instruction included in the window display instruction by controlling the small video window floating on the currently displayed user interface. For example, when the camera 193 detects that the user gesture slides leftward, the window display instruction includes an instruction for controlling a floating position of the window switching control 202 on the video display area 201, that is, moving leftward, based on a current floating position, for a corresponding proportion of distance for which the user gesture slides leftward. For another example, when the camera 193 detects that the user gesture slides in a direction close to the camera, the window display instruction includes an instruction for controlling transparency of the window switching control 202 on the video display area 201, that is, the transparency instruction may be used to control the window switching control 202 to adjust, in a direction of becoming transparent based on current transparency, a corresponding proportion of transparency for which the user gesture slides in a direction close to the camera. The correspondence is not limited to the foregoing listed correspondence between the first preset gesture set and the window display instruction. In specific implementation, there may be another correspondence. This is not limited in this embodiment of this application.

For a manner in which the electronic device 100 determines the window display instruction by recognizing the first gesture, refer to related descriptions in the foregoing embodiments. Details are not described herein again.

(2) How to Control the Second Window to be Displayed on the First Window.

Figure 6:
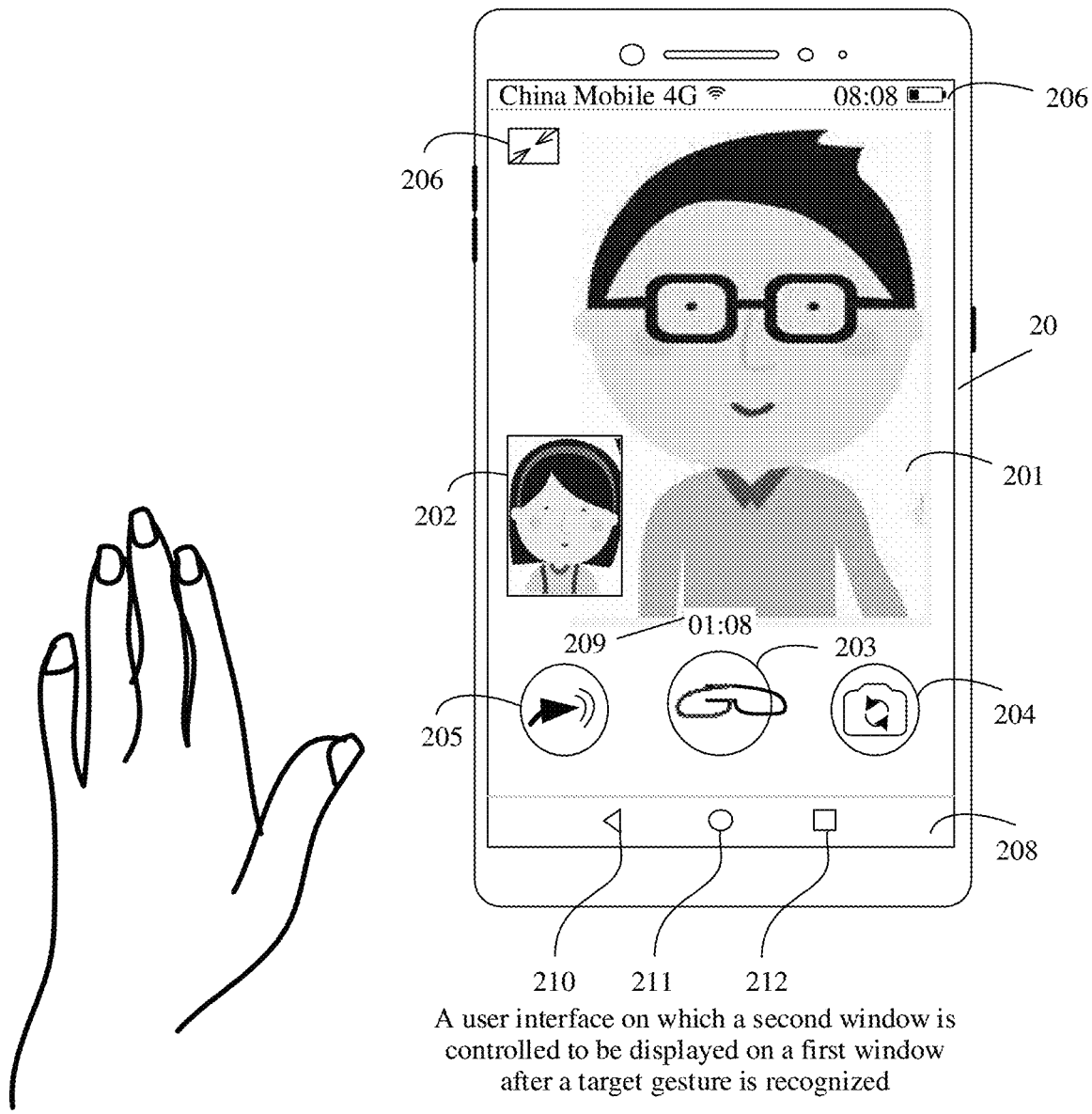
FIG. 6 is a user interface on which a second window is controlled to be displayed on a first window after a first gesture is recognized according to an embodiment of this application.

FIG. 6 is a user interface on which the second window is controlled to be displayed on the first window after the first gesture is recognized according to this embodiment of this application.

As shown in FIG. 6, in response to the gesture operation performed on the camera 193 in the embodiment corresponding to FIG. 2, after determining the window display instruction corresponding to the user gesture detected by the camera 193, the electronic device 100 may control, according to the window display instruction, the window switching control 202 to be displayed on the video display area 201. It may be understood that the window display instruction includes an instruction for controlling one or more of a floating position of the window switching control 202 on the video display area 201, transparency of the window switching control 202, a size of the window switching control 202, or a shape of the window switching control 202. Therefore, the electronic device 100 may control, according to the window display instruction, the window switching control 202 to be displayed on the video display area 201.

In this embodiment of this application, the electronic device may further recognize the user gesture by using an apparatus such as a camera or a gesture recognition sensor, and after determining the window display instruction by using the user gesture, control the window switching control 202 to be displayed on the video display area 201, so as to conveniently control the window switching control 202. Therefore, when it is inconvenient for the user to touch and operate the mobile phone, the window switching control 202 may be flexibly controlled by using an air gesture. This improves user experience. In addition, to prevent false recognition of the user gesture, two gestures are considered to be different gestures when any one of gesture duration information, gesture motion track information, gesture shape information, and the like is different, so that a case in which the window switching control 202 cannot be controlled to be displayed on the video display area 201 according to the user's intention because of false recognition of the user gesture, or the window switching control 202 cannot be controlled because the user gesture cannot be recognized can be avoided by recognizing gesture information of different gestures.

Scenario 2: A scenario in which an electronic device is used to watch a video while making a voice call (After a preset feature is recognized, transparency and a size of a second window are automatically adjusted.)

Figure 7:
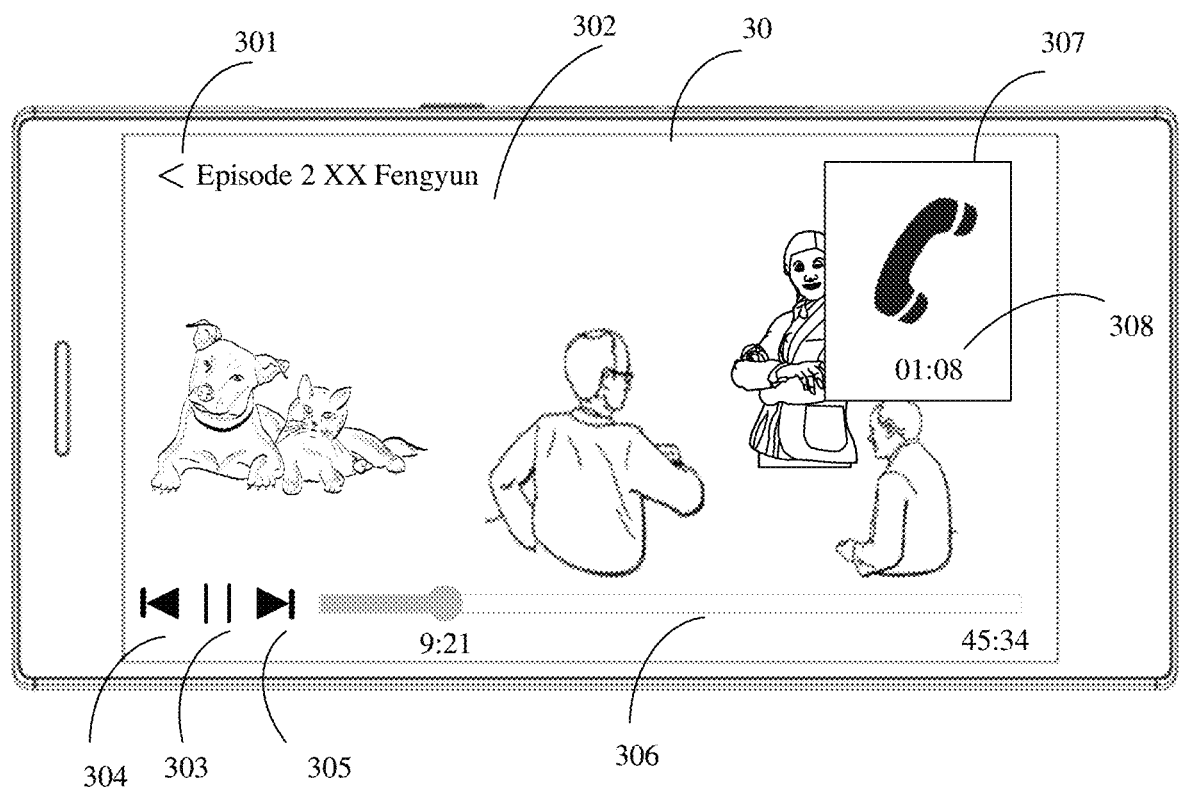
FIG. 7 is a user interface of an electronic device used to watch a video while making a voice call according to an embodiment of this application.

FIG. 7 is a user interface of an electronic device used to watch a video while making a voice call according to an embodiment of this application. The user interface may be a user interface provided by video playback software (for example, iQIYI or Youku).

As shown in FIG. 7, a user interface 30 for viewing a video by a user may include: an exit control 301, a content display area 302, a pause control 303, a previous episode control 304, a next episode control 305, a progress bar 306, a window switching control 307, and a call duration indicator 308.

The exit control 301 may be used to exit a current user interface. The electronic device 100 may detect a touch operation performed on the exit control 301 (for example, a tap operation on the exit control 301). In response to the operation, the electronic device 100 may exit the current user interface.

The content display area 302 may be used to display video content. In addition, the content display area 302 may further adjust playback brightness and playback volume. The electronic device 100 may detect a touch operation (for example, a slide-up or slide-down operation) performed on the left side of the content display area 302. In response to the operation, the electronic device 100 may adjust current playback brightness (increase or decrease). The electronic device 100 may detect a touch operation (for example, a slide-up or slide-down operation) performed on the right side of the content display area 302. In response to the operation, the electronic device 100 may adjust current playback volume (increase or decrease).

The pause control 303 may be used to pause playing a video. The electronic device 100 may detect a touch operation performed on the pause control 303 (for example, a tap operation on the pause control 303). In response to the operation, the electronic device 100 may pause playing the video.

The previous episode control 304 may be used to switch playback content to a previous episode. The electronic device 100 may detect a touch operation performed on the previous episode control 304 (for example, a tap operation on the previous episode control 304). In response to the operation, the electronic device 100 may switch the playback content to the previous episode.

The next episode control 305 may be used to switch the playback content to a next episode. The electronic device 100 may detect a touch operation performed on the next episode control 305 (for example, a tap operation on the next episode control 305). In response to the operation, the electronic device 100 may switch the playback content to the next episode.

The progress bar 306 is used to display a current video playback progress, and may be used to adjust the playback progress. The electronic device 100 may detect a touch operation performed on the progress bar 306 (for example, a sliding operation on the progress bar 306). In response to the operation, the electronic device 100 may adjust the current playback progress.

The window switching control 307 is used to display an icon of a voice call of the electronic device 100 during a voice call, or may be used to switch a voice window. Alternatively the window switching control 307 is used to display an image collected by a camera of the electronic device 100 (or an electronic device of a video contact) during a video call, or may be used to switch a video window. The electronic device 100 may detect a touch operation performed on the window switching control 307 (for example, a tap operation on the window switching control 307). In response to the operation, the electronic device 100 may switch an image displayed in the content display area 302 to an image displayed in the window switching control 302 or a voice call interface of the electronic device 100.

The call duration indicator 308 is used to indicate duration of a current voice call.

When relaxing, people usually talk to friends to discuss a plot while watching a play. In this scenario, if the window switching control 307 blocks video content displayed in the content display area 302, video watching experience of a user is affected. If the window switching control 307 blocks the exit control 301, the pause control 303, the previous episode control 304, the next episode control 305, or the like in the content display area 302, a current user interface cannot be exited at anytime and current playing content cannot be changed by switching at any time. Consequently, the video cannot be viewed smoothly. The foregoing examples list several blocks that may cause a video call to be unsmooth.

Based on the foregoing scenario in which an electronic device is used to watch a video while making a voice call, the following describes some UI embodiments implemented on the electronic device 100.

In this scenario, after a preset feature of the content display area 302 (that is, a first window) is recognized to generate target blocked information, the electronic device 100 may determine the target blocked information, and then the electronic device 100 may determine a window display instruction based on the target blocked information and a display condition, and finally control, according to the window display instruction, the window switching control 307 (that is, the second window) to be displayed on the recognition content display area 302. This can prevent video playback from being unsmooth because a small voice window blocks the video content.

The following provides a detailed description from the following aspects.

(1) How to Determine the Target Blocked Information.

The electronic device 100 may recognize a preset feature (for example, a person or an animal) of the video content displayed in the content display area 302, and determine area information of a target area in which the preset feature is located and current window information of the window switching control 307; determine, based on the area information of the target area and the current window information of the window switching control 307, whether the target area meets a blocking condition of being blocked by the window switching control 307; and if yes, generate the target blocked information. After the target blocked information is generated, the electronic device 100 may determine the target blocked information. The blocking condition includes: if a ratio of an overlapping area between the target area and the window switching control 307 to a display area of the preset feature reaches a preset ratio threshold, determining that the target area is blocked by the second window. The blocking condition further includes: if a ratio of an overlapping area between the target area and the window switching control 307 to a display area of the preset feature reaches a preset ratio threshold, and duration in which the window switching control 307 and the target area overlap exceeds a preset duration threshold, determining that the target area is blocked by the window switching control 307. It may be understood that, in this embodiment of this application, the electronic device 100 may recognize that information displayed in the content display area 302 is blocked by the window switching control 307.

The foregoing listed blocking conditions are not limited. In specific implementation, another blocking condition may be used to determine whether the target area is blocked by the window switching control 307. This is not limited in this embodiment of this application.

(2) How to Determine the Window Display Instruction.

Figure 8:
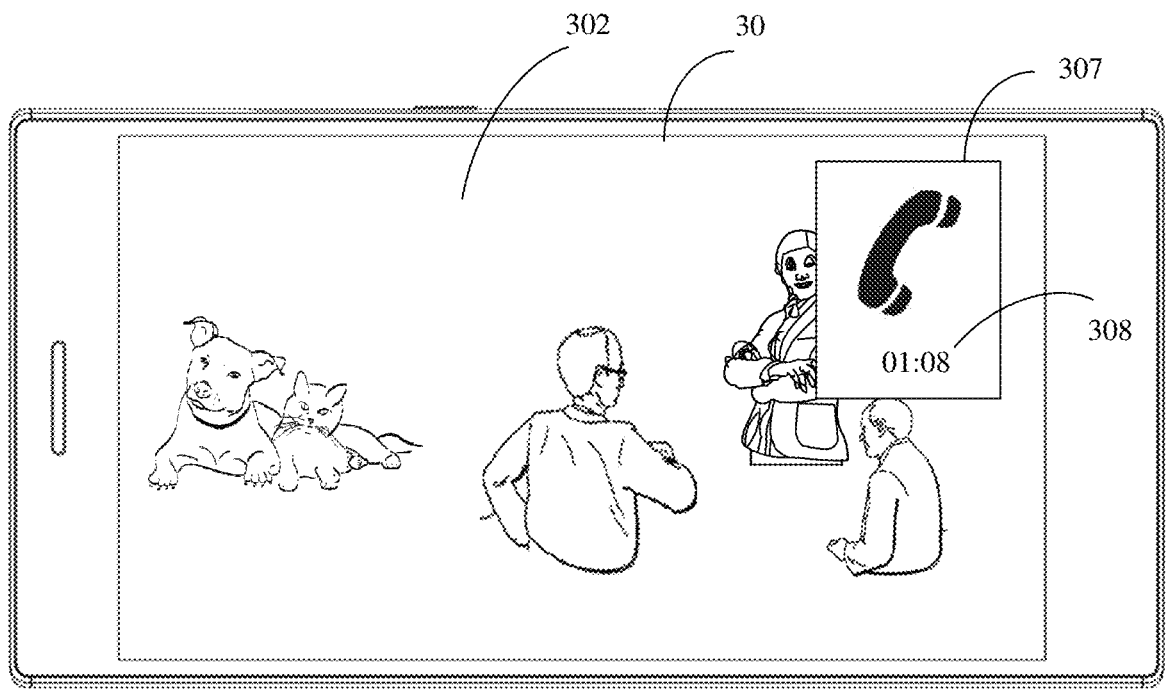
FIG. 8 is a user interface on which a user watches a video while making a voice call after the video starts to be played according to an embodiment of this application.

FIG. 8 is a user interface on which the user watches a video while making a voice call after the video starts to be played according to this embodiment of this application.

As shown in FIG. 8, after the video starts to be played, the content display area 302 in the user interface 30 may include the window switching control 307 and the video content, and other controls gradually disappear after the video is played in full screen, so as to prevent the user from being affected in watching the video.

The electronic device 100 may determine the window display instruction based on the target blocked information. Because in addition to indication information used to indicate that the target area of the first window is blocked by the second window, the target blocked information further includes the area information of the target area and current window information of the second window. The area information includes one or more of the display area of the preset feature and a display position of the preset feature, and the current window information of the second window includes one or more of current floating position information, current transparency information, current size information, and current shape information of the second window. Therefore, the electronic device 100 may determine, based on the blocked information between the window switching control 307 and the content display area 302, the window display instruction used to control the window switching control 307 to be displayed on the content display area 302.

It may be understood that the electronic device 100 may further determine the window display instruction based on the target blocked information and the display condition of the window switching control 307. The display condition includes floating the window switching control 307 on a display area of a preset feature with a lowest display priority in all preset features of the displayed video content in the content display area 302. Alternatively, the display condition includes floating the window switching control 307 on a display area that is of the displayed video content in the content display area 302 except the display area of the preset feature and that is closest to the camera. Alternatively, the display condition includes floating the window switching control 307 on a display area that is of the displayed video content in the content display area 302 except the display area of the preset feature and that has a largest display area. The window display instruction is determined based on the target blocked information and the display condition of the window switching control 307, so that the window display instruction can better control the window switching control 307 to be displayed on the content display area 302, and more conveniently and efficiently control the second window to avoid a special area (for example, a preset feature with a high display priority, a display area far from the camera, or a display area with a small display area) in the user interface of the electronic device. This improves user experience.

(3) How to Control the Second Window to be Displayed on the First Window.

Figure 9:
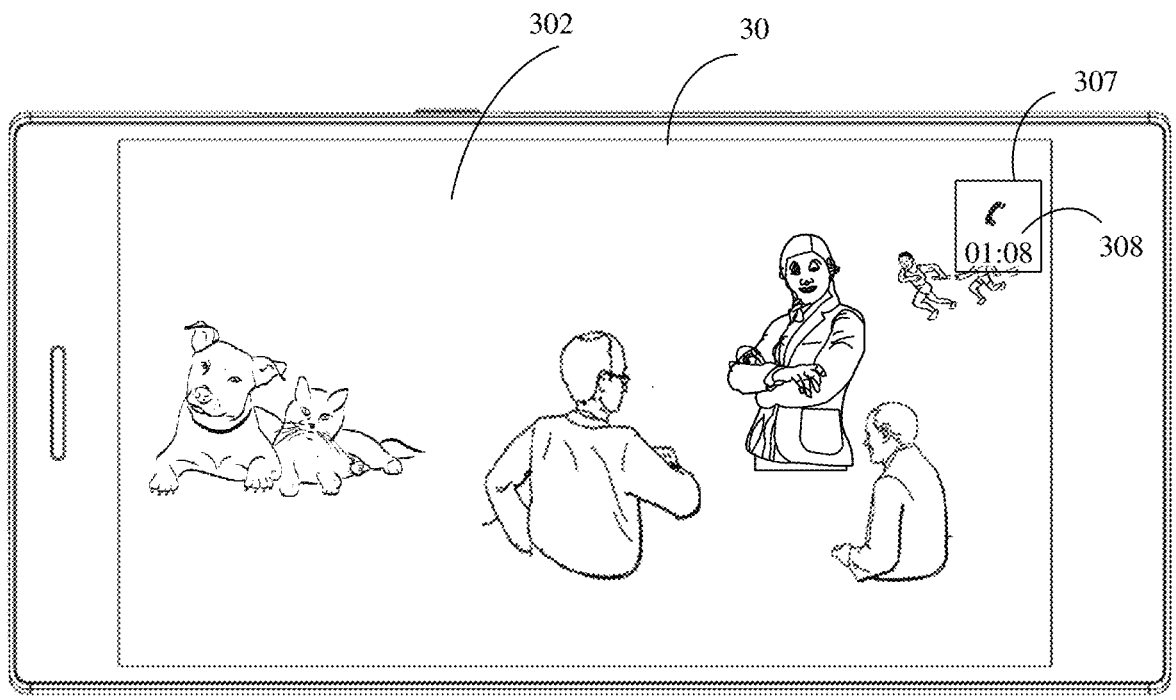
FIG. 9 is a user interface on which a second window is controlled to be displayed on a first window after a preset feature is recognized according to an embodiment of this application.

FIG. 9 is a user interface on which the second window is controlled to be displayed on the first window after the preset feature is recognized according to this embodiment of this application.

As shown in FIG. 9, after the window display instruction is determined based on the target blocked information and the display condition of the window switching control 307, the window switching control 307 is controlled, according to the window display instruction, to be displayed on the content display area 302. In this embodiment of this application, a size and transparency of the window switching control 307 may be changed, so that the video content displayed in the content display area 302 is not blocked. For a manner of controlling the second window to be displayed on the content display area 302, refer to the foregoing embodiments and related descriptions of the following method embodiments. Details are not described herein again.

Figure 10:
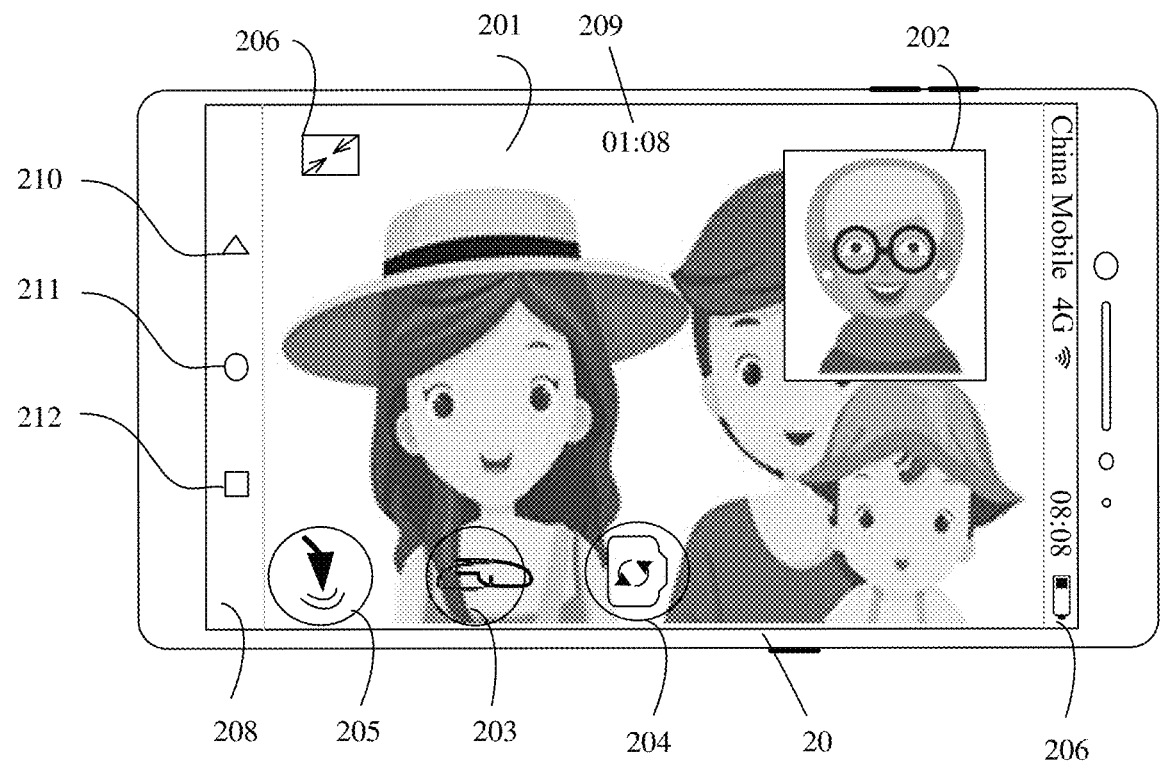
FIG. 10 is a user interface on which a small video window blocks a face during a multi-party video call according to an embodiment of this application.
Figure 11:
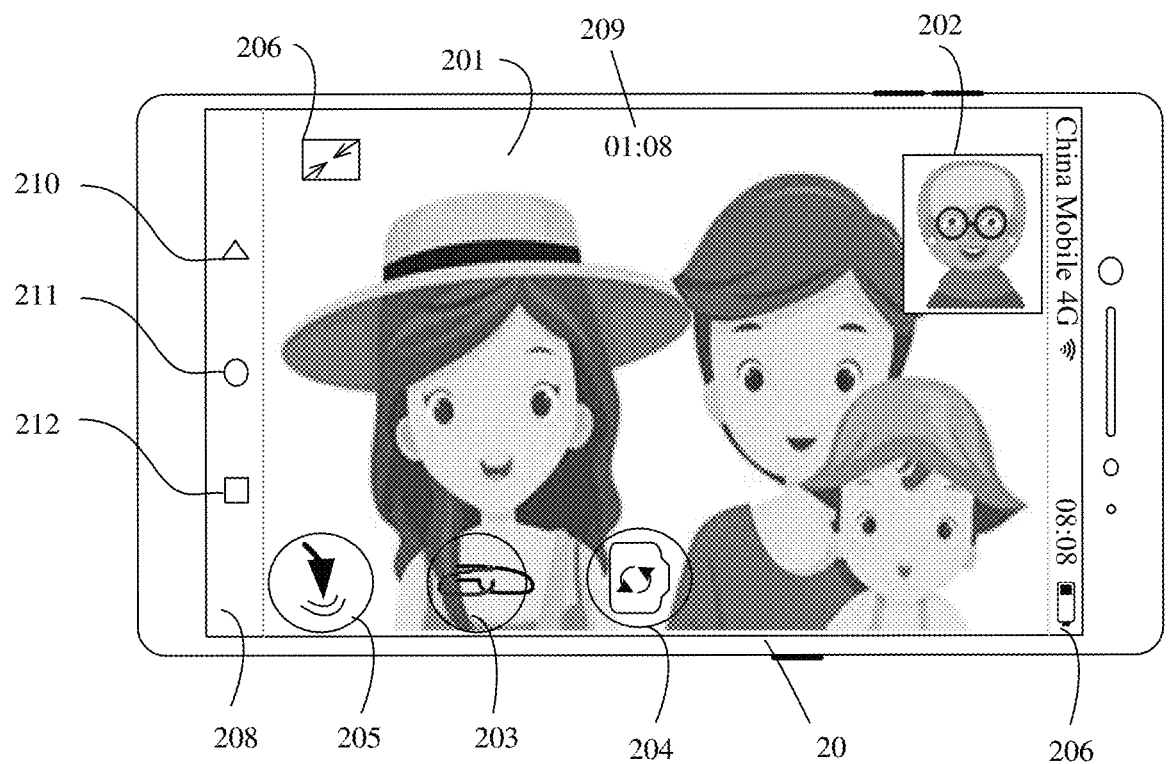
FIG. 11 is a user interface on which a second window is controlled to be displayed on a first window during a multi-party video call according to an embodiment of this application.

In this embodiment of this application, after the area information of the target area and the current window information of the window switching control 307 are monitored, it needs to be determined, based on the monitored information, whether the target area meets the blocking condition of being blocked by the window switching control 307, so as to avoid that when no blocking occurs, user experience is reduced due to frequent movement of the window switching control 307. It is determined that the target area of the content display area 302 is blocked only when an area of the target area covered by the window switching control 307 reaches a specific proportion. This avoids moving the second window because the target area is blocked by a small area while user experience is not affected, thereby reducing meaningless operations. For example, during the video call, the small video window blocks hair of the user, and this occupies only 2% of a target area whose preset feature is a portrait. Therefore, video call experience is not affected, and in this case, display of the small video window on the content display area 302 does not need to be controlled. For another example, based on the example electronic device in the foregoing scenario 1, refer to FIG. 10 and FIG. 11. FIG. 10 is a user interface on which the small video window blocks a face during a multi-party video call in real life according to this embodiment of this application. FIG. 11 is a user interface for controlling the second window to be displayed on the first window during a multi-party video call in real life according to this embodiment of this application. During the video call, the small video window blocks a face of the user, and this occupies 30% of the target area whose preset feature is a portrait. Therefore, the window display instruction needs to be used to control the small video window to be scaled down, so that the blocked face can be normally displayed on the user interface.

Scenario 3: A scenario in which an electronic device is used to play a game while making a video call (After a plurality of preset features are recognized, a floating position and a size of a second window are automatically adjusted.)

When a user is making a video call, a position of a small video window is automatically moved by recognizing a face.

Figure 12:
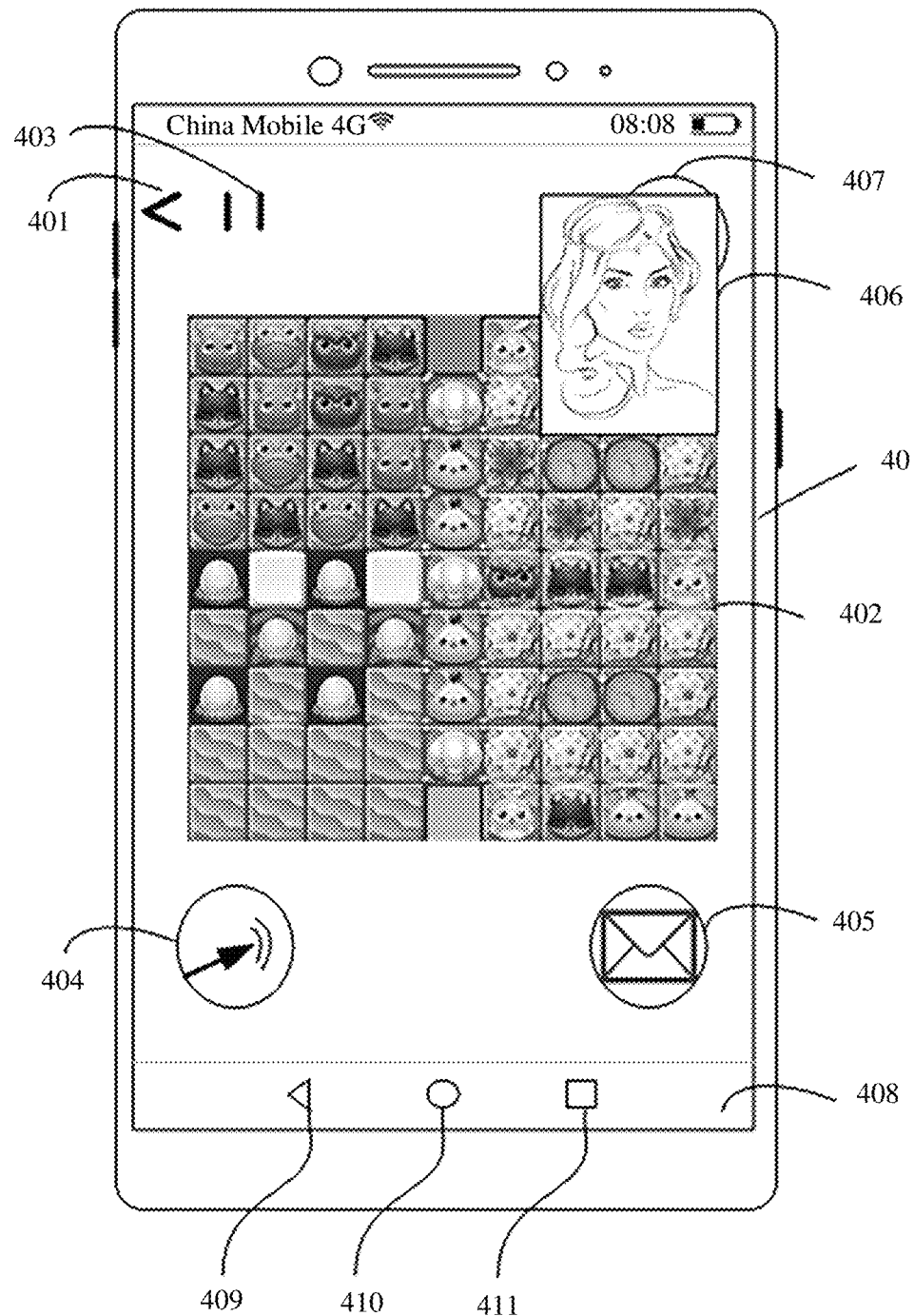
FIG. 12 is a user interface used to make a voice call while playing a game according to an embodiment of this application.

FIG. 12 is a user interface used to make a voice call while playing a game according to an embodiment of this application. The user interface may be a user interface provided by casual game software (for example, Anipop or Craz3 Match).

As shown in FIG. 12, a user interface 40 for viewing a video by the user may include: an exit control 401, a content display area 402, a pause control 403, a prop control 404, a backpack switching control 405, a window switching control 406, a game step control 407, and a navigation bar 408.

The exit control 401 may be used to exit a current user interface. The electronic device 100 may detect a touch operation performed on the exit control 401 (for example, a tap operation on the exit control 401). In response to the operation, the electronic device 100 may exit the current user interface and end the game.

The content display area 402 may be used to display game content. In addition, the content display area 402 may further control a game element control in a game area, to adjust a position of a game element to achieve an objective of playing a game. The electronic device 100 may detect a touch operation (for example, sliding up, sliding down, sliding left, or sliding right) performed on the content display area 402. In response to the operation, the electronic device 100 may move a position of a current game element (for example, move up, move down, move left, or move right).

The pause control 403 may be used to pause the game. The electronic device 100 may detect a touch operation performed on the pause control 403 (for example, a tap operation on the pause control 403). In response to the operation, the electronic device 100 may pause the game.

The prop control 404 may be used to use a game prop to the game element. The electronic device 100 may detect a touch operation performed on the previous episode control 404 (for example, a tap operation on the previous episode control 404). In response to the operation, the electronic device 100 may switch the playback content to the previous episode.

The backpack switching control 405 may be used to switch between backpack windows. The electronic device 100 may detect a touch operation performed on the next episode control 404 (for example, a tap operation on the next episode control 404). In response to the operation, the electronic device 100 may switch an image displayed in the content display area 402 to a backpack image displayed in the backpack switching control 302.

The window switching control 406 is used to display an image collected by a camera of the electronic device 100 (or an electronic device of a video contact), or may be used to switch a video window. The electronic device 100 may detect a touch operation performed on the window switching control 406 (for example, a tap operation on the window switching control 406). In response to the operation, the electronic device 100 may switch an image displayed in the content display area 402 to an image displayed in the window switching control 406 or a voice call interface of the electronic device 100.

The game step control 407 may be used to calculate remaining game steps, and the electronic device 100 may detect a touch operation performed on the content display area 402 (for example, an operation of sliding up, sliding down, sliding left, or sliding right on the content display area 402). After responding to the operation, the remaining game steps of the game step control 407 is correspondingly reduced by one step.

The navigation bar 408 may include system navigation buttons such as a back button 409, a home screen (Home screen) button 410, and a historical call-out task button 411. The home screen is an interface displayed by the electronic device 100 after a user operation performed on the home screen button 410 is detected in any user interface. When detecting that the user taps the back button 409, the electronic device 100 may display a previous user interface of a current user interface. When detecting that the user taps the home screen button 410, the electronic device 100 may display the home screen. When detecting that the user taps the historical call-out task button 411, the electronic device 100 may display a task recently opened by the user. The navigation buttons may alternatively have other names. For example, 409 may be referred to as a back button, 410 may be referred to as a home button, and 411 may be referred to as a menu button. This is not limited in this application. The navigation buttons in the navigation bar 408 are not limited to virtual buttons, and may alternatively be implemented as physical buttons. In some possible embodiments, the system navigation buttons such as the back button 409, the home screen (Home screen) button 410, and the historical call-out task button 411 may also be referred to as a second control.

For example, when relaxing, people usually play some small games when making a video call with a friend. For another example, when connecting with a friend to play a game, placing a small voice window at a fixed position may block a game map and an operation button in the game. This affects a game operation, and reduces gaming experience. In this scenario, if the window switching control 406 blocks game content in the content display area 402, gaming experience and video experience of the user may be affected. If the window switching control 406 blocks the exit control 401, the pause control 403, the prop control 404, the backpack switching control 405, or the like in the content display area 402, a current game interface cannot be exited at any time, a current game interface cannot be paused at any time, or current game content cannot be switched to the backpack at anytime. Consequently, gaming experience is poor. The foregoing examples list several blocks that may cause poor gaming experience.

Based on the foregoing scenario in which an electronic device is used to play a game while making a voice call, the following describes some UI embodiments implemented on the electronic device 100.

In this scenario, after the electronic device 100 recognizes a plurality of preset features of the content display area 402 (that is, a first window) to generate target blocked information, the electronic device 100 determines the target blocked information, and then the electronic device 100 determines a window display instruction based on the target blocked information and a display condition, and finally controls, according to the window display instruction, the window switching control 406 (that is, the second window) to be displayed on the recognition content display area 402. This can prevent poor gaming experience caused by the window switching control 406 blocking the game content.

The following provides a detailed description from the following aspects.

(1) How to Determine the Target Blocked Information.

The content display area 402 currently has N preset features, such as the prop control 404, the backpack switching control 405, the game step control 407, and the game element, where N is an integer greater than or equal to 1. Before the determining the target blocked information, the method further includes: recognizing the N preset features of the content display area 402, and determining display priorities respectively corresponding to the N preset features, where a higher display priority of the preset feature indicates a smaller preset ratio threshold corresponding to the preset feature; determining M pieces of area information respectively corresponding to display areas in which M preset features corresponding to the first M display priorities are located in the N preset features and current window information of the window switching control 406, where M is a positive integer less than or equal to N; and determining, based on the M pieces of area information and the current window information of the window switching control 406, whether the display areas in which the M preset features are located meet the blocking condition, and if the display areas in which the M preset features are located meet the blocking condition, generating the target blocked information. For the blocking condition in which the electronic device 100 determines that the target area is blocked by the window switching control 407, refer to related descriptions in the foregoing embodiments. Details are not described herein again. It may be further understood that a higher display priority of the preset feature indicates a smaller preset duration threshold corresponding to the preset feature. In other words, when the display priority of the preset feature is higher, a time in which the preset feature is allowed to be blocked by the second window is shorter. Therefore, a preset feature that is more "important" to the user is blocked by the second window for a shorter time.

For a manner in which the electronic device 100 determines the M preset features corresponding to the first M display priorities in the N preset features, refer to related descriptions in the following method embodiments. Details are not described herein again.

(2) How to Determine the Window Display Instruction.

For a manner in which the electronic device 100 determines the window display instruction, refer to related descriptions in the foregoing embodiments. Details are not described herein again.

(3) How to Control the Second Window to be Displayed on the First Window.

Figure 13:
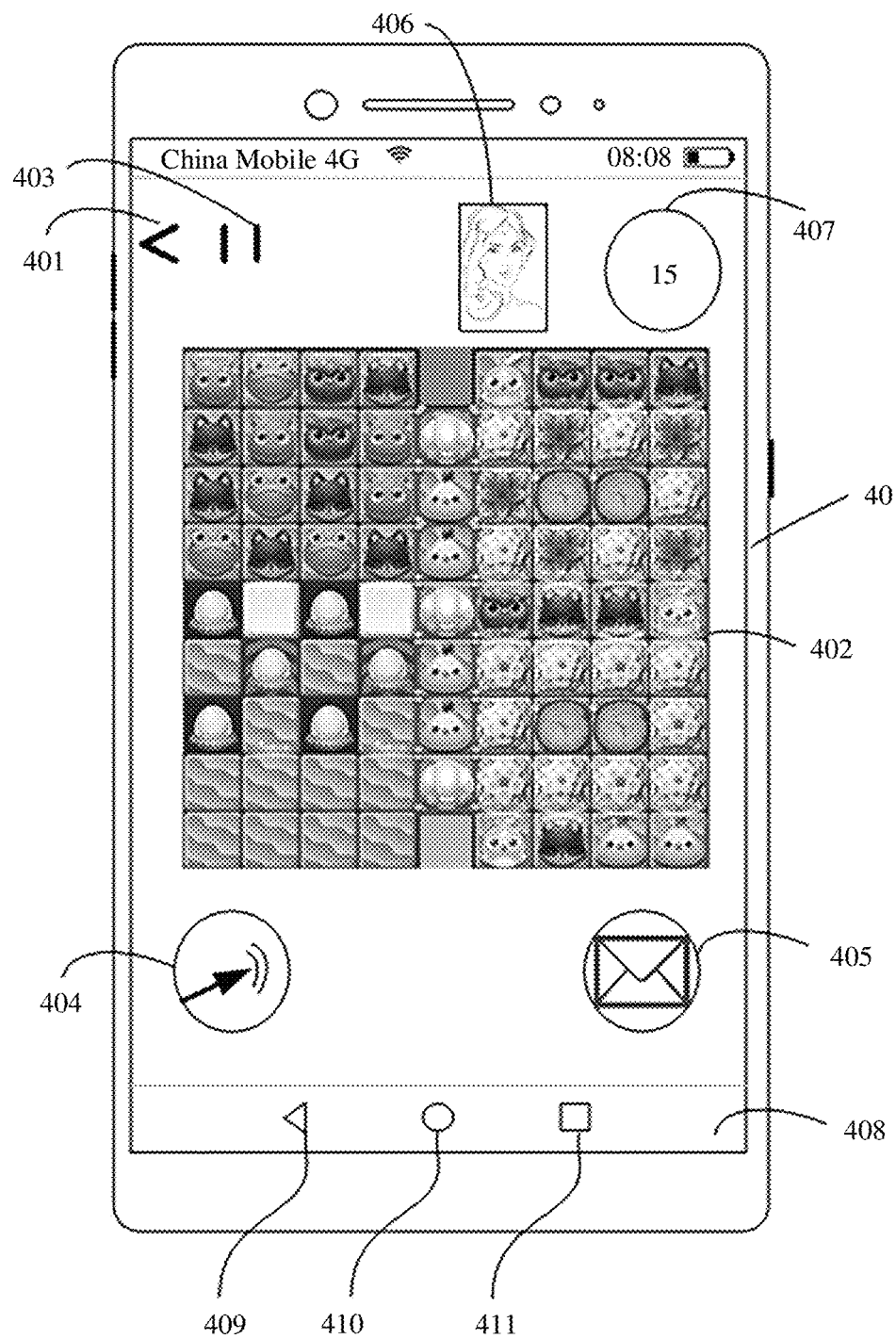
FIG. 13 is a user interface on which a second window is controlled to be displayed on a first window after a plurality of preset features are recognized according to an embodiment of this application.

FIG. 13 is a user interface on which the second window is controlled to be displayed on the first window after the plurality of preset features are recognized according to this embodiment of this application.

Figure 14:
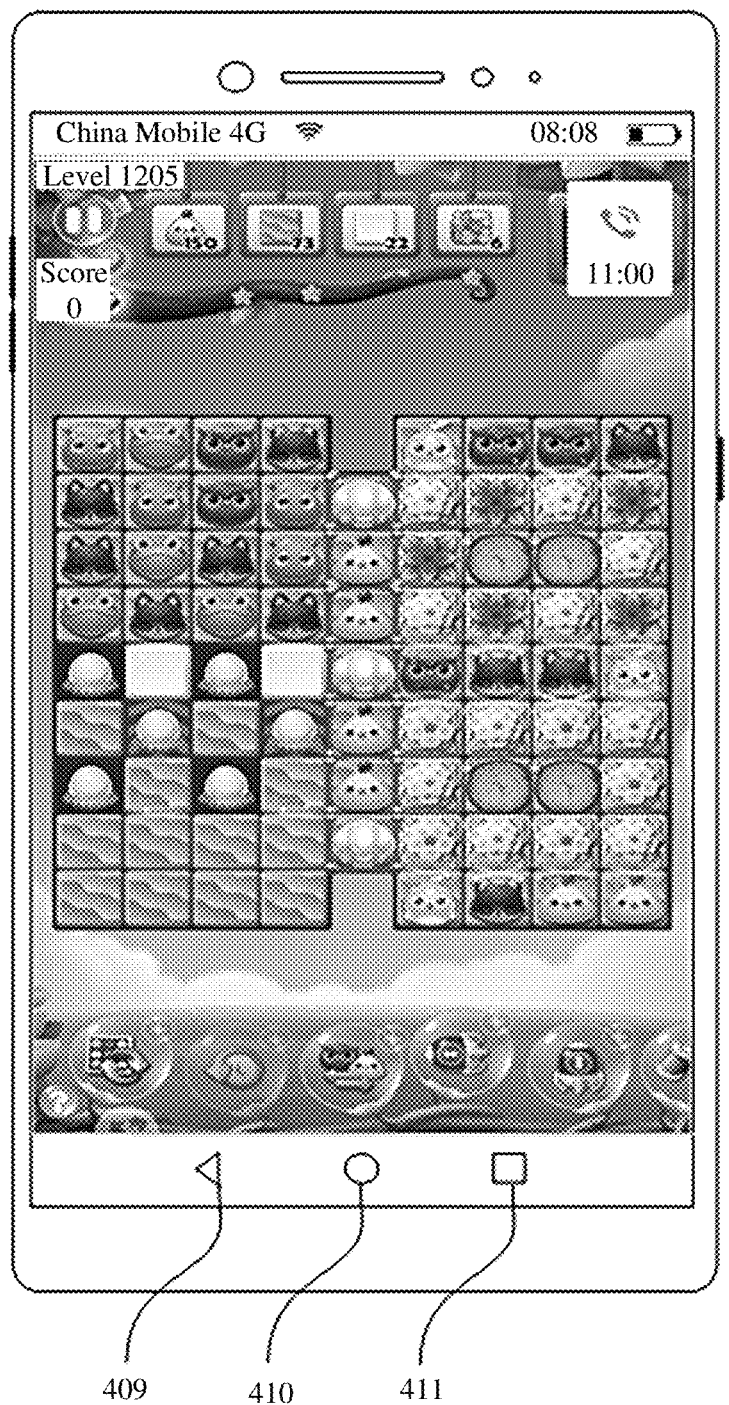
FIG. 14 is a user interface on which a small voice window blocks a game step control when making a voice call while playing a game in real life according to an embodiment of this application.
Figure 15:
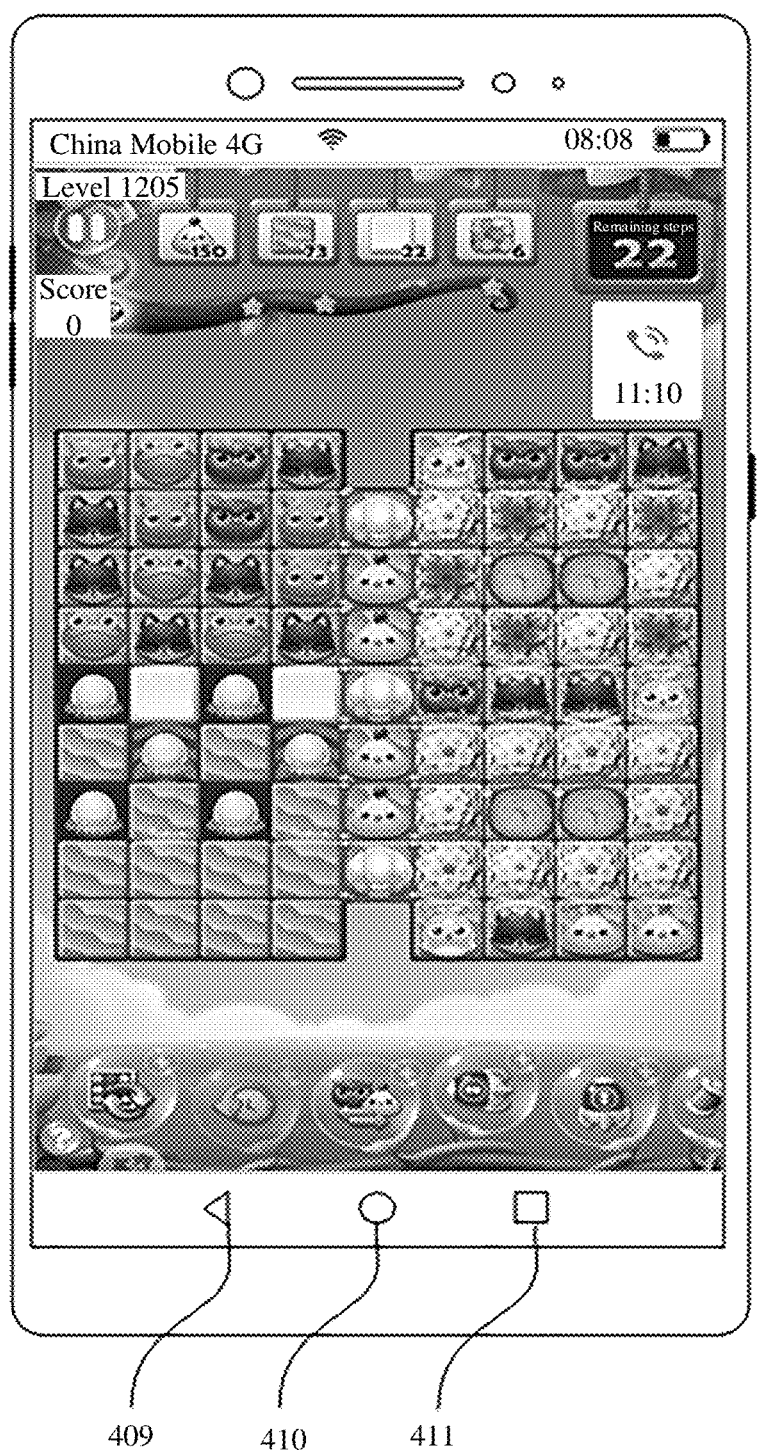
FIG. 15 is a user interface on which a second window is controlled to be displayed on a first window when making a voice call while playing a game in real life according to an embodiment of this application.

As shown in FIG. 13, in this embodiment of this application, after the window display instruction is determined based on the target blocked information and the display condition of the window switching control 406, the window switching control 406 is controlled, according to the window display instruction, to be displayed on the content display area 402. For a manner of controlling the window switching control 406 to be displayed on the content display area 402, refer to the foregoing embodiments and related descriptions of the following method embodiments. Details are not described herein again. For example, refer to FIG. 14. FIG. 14 is a user interface on which a small voice window blocks a game step control when making a voice call while playing a game in real life according to this embodiment of this application. During the voice call, the small voice window blocks the game step control of the user interface, and this occupies 90% of the target area whose preset feature is the game step control. Therefore, the small voice window needs to be controlled to be displayed on the user interface by using the window display instruction, so that the blocked game step control can be normally displayed. In addition, because both the game element and the game step control 407 are preset features with a high display priority, the game element or the game step control 407 cannot be blocked when the small voice window is controlled to be displayed on the user interface. FIG. 15 is a user interface on which the second window is controlled to be displayed on the first window when making a voice call while playing a game in real life according to this embodiment of this application.

In this embodiment of this application, when the plurality of preset features are displayed in the first window, display areas of the first several preset features with a high display priority may be first determined as target areas, and then it is determined whether the target areas are blocked. For example, during a video call, the first window includes a preset feature such as a face, a function button (for example, a hang-up button, a mute button, or a switch camera button), and a background (for example, a vase, a wardrobe, or a television). Because display priorities of the face and the function button are higher than a display priority of the background, it may be considered that the target area is not blocked when the second window blocks the background. When the second window blocks the face or the function button, it is considered that the second window blocks the target area. Therefore, the display areas of the first several preset features with a high display priority are preferably determined as the target areas, so that a case in which whether the second window blocks the first window cannot be accurately and effectively determined when the plurality of preset features appear at the same time can be reduced. In addition, it can be more intelligently recognized whether the second window blocks a preset feature with a high display priority. This improves user experience.

It may be understood that, in some embodiments, in whatever manner the electronic device 100 determines the window display instruction, the electronic device 100 may still control, by using the window display instruction, the second window to be displayed on the first window. It may be further understood that the foregoing three application scenarios are merely several example implementations in the embodiments of this application, and the application scenarios in the embodiments of this application include but are not limited to the foregoing application scenarios.

Figure 16:
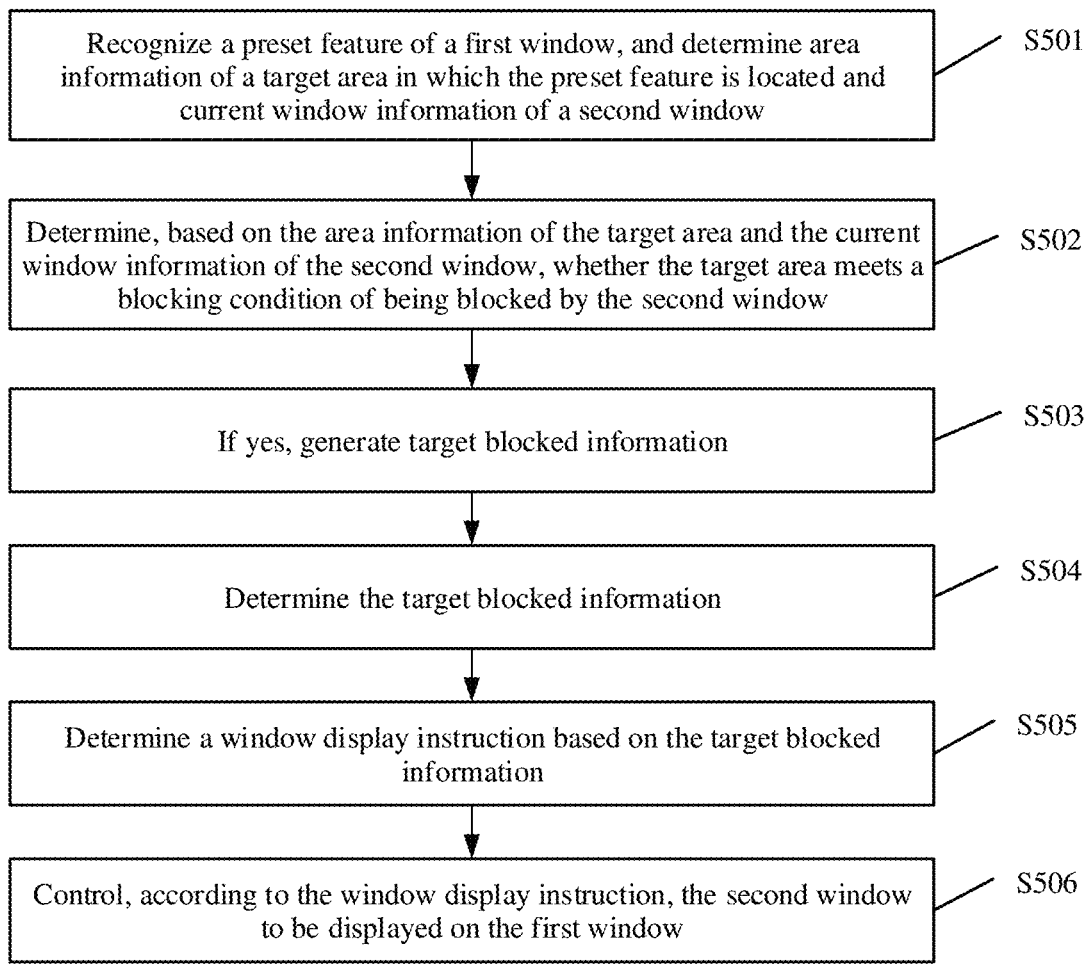
FIG. 16 is a schematic flowchart of a method for controlling a small screen window according to an embodiment of this application.

Based on the five scenarios and the UI embodiments in each scenario provided in FIG. 2 to FIG. 15, the following describes a method for controlling a small screen window according to an embodiment of this application. The method may be applied to the electronic device in FIG. 1A. FIG. 16 is a schematic flowchart of a method for controlling a small screen window according to this embodiment of this application. The following provides descriptions by using an electronic device as an execution body. The method may include the following steps S501 to S506.

Step S501: Recognize a preset feature of a first window, and determine area information of a target area in which the preset feature is located and current window information of a second window.

Specifically, the electronic device recognizes the preset feature of the first window, and determines the area information of the target area in which the preset feature is located and the current window information of the second window. The area information includes one or more of a display area of the preset feature and a display position of the preset feature, and the current window information of the second window includes one or more of current floating position information, current transparency information, current size information, and current shape information of the second window.

Optionally, the preset feature may be an image feature that is set by a user and that is displayed on the first window, for example, an image of a person during the video call in the foregoing scenario 1, or the function button, the game element, or the like in the foregoing scenario 3. The area information may further include a display priority of the preset feature. The display priority may also identify importance of the preset feature, and a preset feature with a higher display priority cannot be blocked. For example, a display priority of a face is higher than a display priority of a body. Therefore, when the second window is controlled to be displayed on the first window, a display area of the face cannot be blocked.

Step S502: Determine, based on the area information of the target area and the current window information of the second window, whether the target area meets a blocking condition of being blocked by the second window.

Specifically, the electronic device determines, based on the area information of the target area and the current window information of the second window, whether the target area meets the blocking condition of being blocked by the second window. It may be understood that the electronic device determines, based on the area information of the target area and the current window information of the second window that are monitored, whether the target area meets the blocking condition of being blocked by the second window, so as to prevent a case when no blocking occurs, user experience is reduced due to frequent movement of the second window.

Optionally, the blocking condition may include: if a ratio of an overlapping area between the target area and the second window to the display area of the preset feature reaches a preset ratio threshold, determining that the target area is blocked by the second window. The preset ratio threshold may be a default threshold of the electronic device, or may be an updated threshold of the electronic device according to a setting of the user. For example, during a video call, the preset feature is a portrait, a small video window blocks hair of the user, and this occupies only 2% of a target area. In this case, a preset blocking condition is not met. Therefore, display of the small video window on the first window does not need to be controlled. For another example, in the related description of the multi-party video call in the foregoing scenario 2, the small video window blocks a face of the user, and this occupies 30% of the target area whose preset feature is a portrait. In this case, the preset blocking condition is met. Therefore, a window display instruction needs to be used to control the display of the small video window on a user interface, so that the blocked face can be normally displayed.

Optionally, the blocking condition may further include: if a ratio of an overlapping area between the target area and the second window to the display area of the preset feature reaches a preset ratio threshold, and duration in which the second window and the target area overlap exceeds a preset duration threshold, determining that the target area is blocked by the second window. The preset duration threshold may be a default threshold of the electronic device, or may be an updated threshold of the electronic device according to a setting of the user. It is determined that the target area of the first window is blocked only after an area of the target area covered by the second window reaches a specific proportion and lasts for a period of time, to prevent frequently controlling display of the second window on the first window after it is determined that the second window blocks the first window when a short time change occurs on a preset feature of the target area, and affecting user experience.

Step S503: if yes, generate target blocked information.

Specifically, after the electronic device determines, based on the area information of the target area and the current window information of the second window, that the target area meets the blocking condition of being blocked by the second window, the electronic device may generate the target blocked information. The target blocked information includes indication information used to indicate that the target area of the first window is blocked by the second window. The target area is a display area of the preset feature in the first window.

Optionally, the target blocked information may further include the area information of the target area and the current window information of the second window. The area information includes one or more of the display area of the preset feature and the display position of the preset feature, and the current window information of the second window includes one or more of the current floating position information, the current transparency information, the current size information, and the current shape information of the second window.

Optionally, the first window currently has N preset features, where N is an integer greater than or equal to 1. Before the determining target blocked information, the method further includes: recognizing the N preset features of the first window, and determining display priorities respectively corresponding to the N preset features, where a higher display priority of the preset feature indicates a smaller preset ratio threshold corresponding to the preset feature; determining M pieces of area information respectively corresponding to display areas in which M preset features corresponding to the first M display priorities are located in the N preset features and the current window information of the second window, where M is a positive integer less than or equal to N; and determining, based on the M pieces of area information and the current window information of the second window, whether the display areas in which the M preset features are located meet the blocking condition, and if the display areas in which the M preset features are located meet the blocking condition, generating the target blocked information. For example, in the related description of the foregoing scenario 3, because both the game element and the game step control 407 are preset features with a high display priority, the game element or the game step control 407 cannot be blocked when the small voice window is controlled to be displayed on the user interface. It may be understood that M preset features corresponding to the first M display priorities in the N preset features may be preset features with a highest display priority in the N preset features, and there are M preset features. The M preset features corresponding to the first M display priorities in the N preset features may alternatively be M preset features whose display priorities rank at the forefront in the N preset features. Optionally, a higher display priority of the preset feature indicates a smaller preset duration threshold corresponding to the preset feature. In other words, a higher display priority of the preset feature indicates a shorter time in which the preset feature is allowed to be blocked by the second window. For example, during the video call, preset features included in a current user interface are a portrait and a background. Assuming that the small video window blocks 20% of a display area of both the portrait and the background, after the portrait is blocked for 5 s, the electronic device can determine that the small video window blocks the target area, and the electronic device may determine that the small video window blocks the target area only after the background is blocked for 20 s.

In a possible implementation, a first gesture is recognized, and it is determined whether the first gesture is one of a first preset gesture set. If it is determined that the first gesture is one of the first preset gesture set, the target blocked information is generated. It may be understood that if the electronic device cannot automatically recognize that the target area of the first window is blocked by the second window, or the user needs to control, according to the user's attention, the second window to be displayed on the first window, the electronic device may recognize a user gesture by using a camera, an infrared sensor, a gesture sensor, or the like. If it is determined that the gesture is one of the first preset gesture set, the target blocked information may be generated. Optionally, the recognizing a first gesture includes: recognizing one or more of gesture duration information, gesture motion track information, and gesture shape information of the first gesture. If any one of the gesture duration information, the gesture motion track information, and the gesture shape information of two preset gestures is different, it may be considered that the two preset gestures are different preset gestures. Two gestures with different information in any one of gesture duration information, gesture motion track information, gesture shape information, and the like may be considered as different gestures. Therefore, to prevent incorrect recognition of the user gesture, different information of the gesture may be recognized, so as to avoid a case in which the second window cannot be controlled because the user gesture cannot be recognized or the second window cannot be flexibly controlled to be displayed on the first window according to the user's intention because the user gesture is incorrectly recognized. For example, in the related description of the foregoing scenario 1, the target blocked information may be generated after it is determined that the gesture is one of the first preset gesture set when the camera 193 detects that the user gesture slides in a direction close to the camera.

Figure 17:
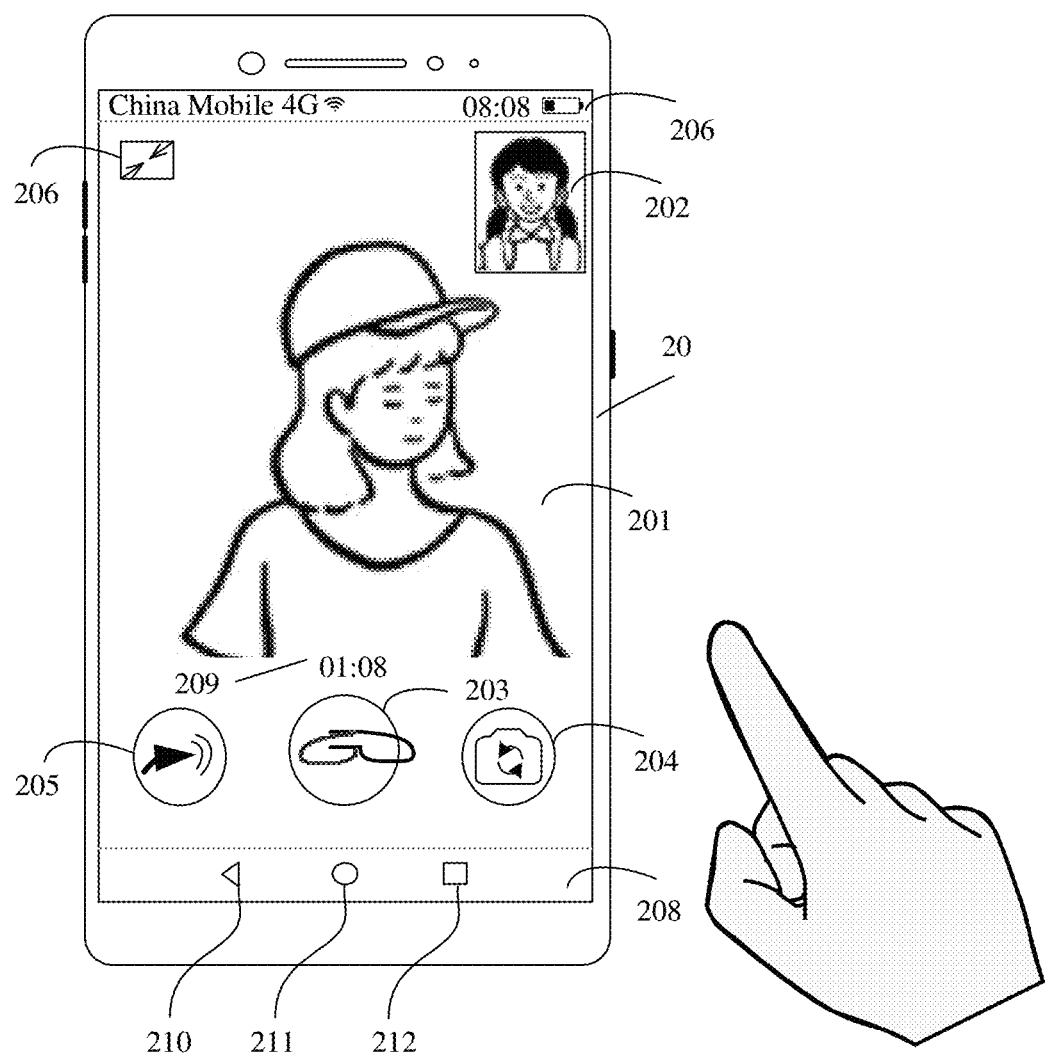
FIG. 17 is a schematic diagram of a scenario in which a second gesture is recognized according to an embodiment of this application.

In a possible implementation, a second gesture is recognized, and it is determined whether the second gesture is one of a second preset gesture set. The second preset gesture set is a gesture set for controlling one or more function buttons in the first window. If the second gesture is one of the second preset gesture set, a button control instruction is determined based on the second gesture and a correspondence between a preset gesture in the second preset gesture set and a function button; and a target function button in the first window is controlled, according to the button control instruction, to perform a corresponding function. The target function button is a function button corresponding to the second gesture. For example, refer to FIG. 17. FIG. 17 is a schematic diagram of a scenario in which the second gesture is recognized according to this embodiment of this application. With reference to the related description of the video call scenario in the foregoing scenario 1, if it is determined that the user gesture detected by the camera 193 is one of the second preset gesture set, the electronic device 100 may determine the button control instruction based on the second gesture and the correspondence between the preset gesture in the second preset gesture set and the function button, and control the target function button in the first window to perform a corresponding function, for example, hang up a current video, switch a camera, convert a video call into a voice call, or switch a video window. Optionally, because two gestures with different information in any one of gesture duration information, gesture motion track information, gesture shape information, and the like are considered as different gestures, the recognizing a second gesture may include: recognizing one or more of gesture duration information, gesture motion track information, and gesture shape information of the second gesture. Optionally, the electronic device may further flash a cursor (for example, hand, arrow, or round cursor) on the user interface to indicate that the user gesture is one of the second preset gesture set. It may be understood that the correspondence is not limited to the foregoing listed correspondence between the second preset gesture set and the function button. In specific implementation, there may be another correspondence. This is not limited in this embodiment of this application. Therefore, the electronic device recognizes the user gesture by using an apparatus such as the camera or a gesture recognition sensor, determines that the user gesture is one of the second preset gesture set, and then determines the button control instruction based on the user gesture, so as to control the target function button in the first window to perform the corresponding function. In this way, the user does not need to touch the screen of the device, and can flexibly control the function button by using an air gesture. This frees hands of the user, and improves user experience.

Step S504: Determine the target blocked information.

Specifically, after generating the target blocked information, the electronic device may determine the target blocked information. It may be understood that if the electronic device determines the target blocked information, it is identified that the target area of the first window is blocked by the second window, and the target blocked information may be generated.

Step S505: Determine the window display instruction based on the target blocked information.

Specifically, after determining the target blocked information, the electronic device may determine the window display instruction based on the target blocked information. The window display instruction includes an instruction for controlling one or more of a floating position of the second window on the first window, transparency of the second window, a size of the second window, and a shape of the second window. The window display instruction may control movement of the second window, adjust the transparency of the second window, and adjust the size and the shape of the second window, so that the second window is not in the target area that blocks the first window. This improves user experience. It may be understood that the window display instruction may further include information about the floating position of the second window on the first window, transparency information of the second window, size information of the second window, shape information of the second window, and the like. The foregoing information may be considered as window information of the second window after the second window is controlled, according to the window display instruction, to be displayed in the first window.

Optionally, the window display instruction is determined based on the target blocked information and a display condition of the second window. The display condition includes floating the second window on a display area of a preset feature with a lowest display priority in all the preset features of the first window, for example, a non-blocking function button, and a coverable area of an image: background>body>hair>face. Alternatively, the display condition includes floating the second window on a display area that is of the first window except the display area of the preset feature and that is closest to the camera, for example, a location that is in the display area except the display area of the preset feature and that is close to the camera is preferred, so that it can be convenient for the user to better observe a situation of the second window when transferring information through the camera. Alternatively, the display condition includes floating the second window on a display area that is of the first window except the display area of the preset feature and that has a largest display area, for example, preferably floating the second window at a position that is in the display area except the display area of the preset feature and that has a large blank area. Therefore, when determining the window display instruction, the electronic device needs to consider the display condition of the second window, to maximize practicability of the window display instruction, avoid second adjustment by the user, and improve user experience.

Optionally, the window display instruction corresponding to the first gesture is determined based on the first gesture and a correspondence between a preset gesture and a preset window display instruction. The window display instruction is one of a plurality of preset window display instructions. It may be understood that the first gesture may be in a one-to-one correspondence with the preset window display instruction, for example, a finger splay gesture may be used to control movement of the second window when moving leftward or rightward, and may be used to adjust the transparency of the second window when moving backward or forward; the size of the second window may be adjusted when a fist is opened; and a rotate gesture may be used to adjust the shape of the second window. For example, in the related description of the foregoing scenario 1, when the camera 193 detects that the user gesture slides in a direction close to the camera, it may be determined that the window display instruction includes an instruction for controlling transparency of the window switching control 202 on the video display area 201, that is, the transparency instruction may be used to control the window switching control 202 to adjust, in a direction of becoming transparent based on current transparency, a corresponding proportion of transparency for which the user gesture slides in a direction close to the camera.

Step S506: Control, according to the window display instruction, the second window to be displayed on the first window.

Specifically, because the window display instruction includes the instruction for controlling one or more of the floating position of the second window on the first window, the transparency of the second window, the size of the second window, and the shape of the second window, the electronic device may control display of the second window on the first window according to the window display instruction by controlling movement of the second window, adjusting the transparency of the second window, and adjusting the size and the shape of the second window, so that a blocked target area is also displayed. This improves user experience.

In this embodiment of this application, after determining that the second window blocks the target area of the first window, the electronic device determines the window display instruction based on the target blocked information, and then controls, according to the window display instruction, one or more of the floating position, the transparency, the size, or the shape of the second window, so that when the second window is displayed on the first window, the preset feature in the first window is no longer blocked. For example, in a video call process, when a small video window blocks a face, blocked information indicating that the face is blocked is determined, then a display instruction for moving or scaling down the small video window is determined based on the blocked information, and finally, according to the display instruction, the small video window is automatically moved to an optimal display position and a size of the small video window is reduced. In this process, a user does not need to touch the mobile phone, and excellent video call quality can be achieved. In conclusion, in this embodiment of this application, display of the second window on the first window (which may also be a user interface) is controlled through intelligent recognition and determining. The user does not need to perform a related operation of touching the electronic device, such as touching a screen or pressing a button, and the second window can be more conveniently displayed without affecting a special area in the user interface. This greatly improves user experience.

In the foregoing embodiments, descriptions of the embodiments have respective focuses. For a part that is not described in detail in an embodiment, refer to related descriptions in other embodiments.

It should be noted that, for brief description, the foregoing method embodiments are represented as a series of actions. However, persons skilled in the art should appreciate that this application is not limited to the described order of the actions, because according to this application, some steps may be performed in other orders or simultaneously. It should be further appreciated by the persons skilled in the art that the embodiments described in this specification all belong to preferred embodiments, and the involved actions and modules are not necessarily required in this application.

In the several embodiments provided in this application, it should be understood that the disclosed apparatuses may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form or another form.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the foregoing integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device, and may be specifically a processor in the computer device) to perform all or some of the steps of the methods described in the embodiments of this application. The foregoing storage medium may include: any medium that can store program code, such as a USB flash drive, a removable hard disk, a magnetic disk, an optical disc, a read-only memory (Read Only Memory, ROM for short), or a random access memory (Random Access Memory, RAM for short).

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method comprising:
   identifying N preset features of a first window on a screen of an electronic device;
   determining respective display priorities of the N preset features, wherein a higher display priority of a preset feature indicates a smaller value of a preset ratio threshold corresponding to the preset feature;
   determining M pieces of area information of respective display areas in which M preset features of the N preset features are located respectively, the M preset features having top M display priorities among the N preset features, wherein M is a positive integer less than or equal to N, and N is a positive integer greater than or equal to 1;
   determining current window information of a second window on the screen;
   determining, based on the M pieces of area information of the respective display areas and the current window information of the second window, that the respective display areas meet a blocking condition of being blocked by the second window, wherein the blocking condition comprises: a ratio of an overlapping area between the respective display areas and the second window to the respective display areas reaches a corresponding preset ratio threshold, and a duration in which the second window and the respective display areas overlap exceeds a preset duration threshold;
   in response to the respective display areas meeting the blocking condition:
      generating target blocked information indicating that the respective display areas of the first window are blocked by the second window;
      determining a window display instruction based on the target blocked information, the window display instruction for controlling one or more of: a floating position of the second window on the first window, transparency of the second window, a size of the second window, or a shape of the second window; and
   controlling, according to the window display instruction, to display the second window on the first window without blocking the respective display areas.

2. The method according to claim 1, wherein the target blocked information further comprises the M pieces of area information of the respective display areas and the current window information of the second window, wherein the M pieces of area information comprise one or more of: a first display area of a first preset feature of the N preset features or a display position of the first preset feature, and wherein the current window information of the second window comprises one or more of: current floating position information, current transparency information, current size information, or current shape information of the second window.

3. The method according to claim 1, wherein determining the window display instruction based on the target blocked information comprises:
   determining the window display instruction based on the target blocked information and a display condition of the second window, wherein:
      the display condition comprises floating the second window on a display area of a preset feature of the N preset features with a lowest display priority in all the N preset features of the first window;
      the display condition comprises floating the second window on a display area that is of the first window except a display area of a preset feature of the N preset features and that is closest to a camera of the electronic device; or
      the display condition comprises floating the second window on a display area that is of the first window except a display area of a preset feature of the N preset features, and that has a largest display area in the first window.

4. The method according to claim 1, wherein before generating the target blocked information, the method further comprises:

detecting a gesture of a user of the electronic device, and determining whether the gesture is one of a preset gesture set, the preset gesture set configured for controlling the second window; and when the gesture is one of the preset gesture set, generating the target blocked information; and wherein determining the window display instruction based on the target blocked information comprises:
determining, based on the gesture and a correspondence between the gesture and the window display instruction, wherein the window display instruction is one of a plurality of preset window display instructions.

5. The method according to claim 1, wherein the method further comprises:
detecting a gesture of a user of the electronic device, and determining whether the gesture is one of a preset gesture set, the preset gesture set configured for controlling one or more function buttons in the first window;

when the gesture is one of the preset gesture set, determining a button control instruction based on the gesture and a correspondence between the gesture in the preset gesture set and a function button; and controlling, according to the button control instruction, the function button in the first window to perform a corresponding function.

6. The method according to claim 4, wherein detecting the gesture of the user comprises detecting at least one of: gesture duration information, gesture motion track information, and gesture shape information.

7. The method according to claim 4, wherein detecting the gesture of the user comprises detecting at least two aspects of the gesture of the user.

8. An electronic device, comprising one or more processors, a non-transitory memory, and one or more buttons, wherein
the non-transitory memory, a display, and the one or more buttons are coupled to the one or more processors, the non-transitory memory stores computer program code, and the computer program code comprises computer instructions that, when executed by the one or more processors, cause the electronic device to perform:
identifying N preset features of a first window on the display of the electronic device;
determining respective display priorities of the N preset features, wherein a higher display priority of a preset feature indicates a smaller value of a preset ratio threshold corresponding to the respective preset feature;
determining M pieces of area information of respective display areas in which M preset features of the N preset features are located respectively, the M preset features having top M display priorities among the N preset features, wherein M is a positive integer less than or equal to N, and wherein N is a positive integer greater than or equal to 1;
determining current window information of a second window on the display;
determining, based on the M pieces of area information of the respective display areas and the current window information of the second window, that the respective display areas meet a blocking condition of being blocked by the second window, wherein the blocking condition comprises: a ratio of an overlapping area between the respective display areas and the second window to the respective display areas reaches a corresponding preset ratio threshold, and a duration in which the second window and the respective display areas overlap exceeds a preset duration threshold;
in response to the respective display areas meeting the blocking condition:
generating target blocked information indicating that the respective display areas of the first window are blocked by the second window;
determining a window display instruction based on the target blocked information, the window display instruction for controlling one or more of: a floating position of the second window on the first window, transparency of the second window, a size of the second window, or a shape of the second window; and
controlling, according to the window display instruction, to display the second window on the first window without blocking the respective display areas.

9. The electronic device according to claim 8, wherein the target blocked information further comprises the M pieces of area information of the respective display areas and the current window information of the second window, wherein the M pieces of area information comprise one or more of: a display area of a first preset feature of the N preset features or a display position of the first preset feature, and wherein the current window information of the second window comprises one or more of: current floating position information, current transparency information, current size information, or current shape information of the second window.

10. The electronic device according to claim 8, wherein determining the window display instruction based on the target blocked information comprises:
determining the window display instruction based on the target blocked information and a display condition of the second window, wherein:
the display condition comprises floating the second window on a display area of a preset feature of the N preset features with a lowest display priority in all the N preset features of the first window;
the display condition comprises floating the second window on a display area that is of the first window except a display area of a preset feature of the N preset features and that is closest to a camera of the electronic device; or
the display condition comprises floating the second window on a display area that is of the first window except a display area of a preset feature of the N preset features and that has a largest display area in the first window.

11. The electronic device according to claim 8, wherein before the generating the target blocked information, the computer instructions cause the electronic device further to perform:
detecting a gesture of a user of the electronic device, and determining whether the gesture is one of a preset gesture set, the preset gesture set configured for controlling the second window; and
when the gesture is one of the preset gesture set, generating the target blocked information; and
wherein the determining the window display instruction based on the target blocked information comprises:
determining, based on the gesture and a correspondence between the gesture and the window display instruction, wherein the window display instruction is one of a plurality of preset window display instructions.

12. The electronic device according to claim 8, wherein the computer instructions cause the electronic device further to perform:
- detecting a gesture of a user of the electronic device, and determining whether the gesture is one of a preset gesture set, the preset gesture set configured for controlling one or more function buttons in the first window;
- when the gesture is one of the preset gesture set, determining a button control instruction based on the gesture and a correspondence between the gesture in the preset gesture set and a function button; and
- controlling, according to the button control instruction, the function button in the first window to perform a corresponding function.

13. The electronic device according to claim 11, wherein detecting the gesture of the user comprises detecting at least one of: gesture duration information, gesture motion track information, and gesture shape information.

14. The electronic device according to claim 11, wherein detecting the gesture of the user comprises detecting at least two aspects of the gesture of the user.

15. A non-transitory computer storage medium, comprising computer instructions, wherein the computer instructions, when running on an electronic device, cause the electronic device to perform:
- identifying N preset features of a first window on a screen of the electronic device;
- determining respective display priorities of the N preset features, wherein a higher display priority of a preset feature indicates a smaller value of a preset ratio threshold corresponding to the preset feature;
- determining M pieces of area information of respective display areas in which M preset features of the N preset features are located respectively, the M preset features having top M display priorities among the N preset features, wherein M is a positive integer less than or equal to N, and wherein N is a positive integer greater than or equal to 1;
- determining current window information of a second window on the screen;
- determining, based on the M pieces of area information of the respective display areas and the current window information of the second window, that the respective display areas meet a blocking condition of being blocked by the second window, wherein the blocking condition comprises: a ratio of an overlapping area between the respective display areas and the second window to the respective display areas reaches a corresponding preset ratio threshold, and a duration in which the second window and the respective display areas overlap exceeds a preset duration threshold;
- in response to the respective display areas meeting the blocking condition:
  - generating target blocked information indicating that the respective display areas of the first window are blocked by the second window;
  - determining a window display instruction based on the target blocked information, the window display instruction for controlling one or more of: a floating position of the second window on the first window, transparency of the second window, a size of the second window, or a shape of the second window; and
  - controlling, according to the window display instruction, to display the second window on the first window without blocking the respective display areas.

16. The computer storage medium according to claim 15, wherein the target blocked information further comprises the M pieces of area information of the respective display areas and the current window information of the second window, wherein the M pieces of area information comprise one or more of: a display area of a first preset feature of the N preset features or a display position of the first preset feature, and wherein the current window information of the second window comprises one or more of: current floating position information, current transparency information, current size information, or current shape information of the second window.

17. The computer storage medium according to claim 16, wherein determining the window display instruction based on the target blocked information comprises:
- determining the window display instruction based on the target blocked information and a display condition of the second window, wherein:
  - the display condition comprises floating the second window on a display area of a preset feature of the N preset features with a lowest display priority in all the N preset features of the first window;
  - the display condition comprises floating the second window on a display area that is of the first window except a display area of a preset feature of the N preset features and that is closest to a camera; or
  - the display condition comprises floating the second window on a display area that is of the first window except a display area of a preset feature of the N preset features, and that has a largest display area.

18. The computer storage medium according to claim 15, wherein before the generating the target blocked information, the computer instructions cause the electronic device further to perform:
- detecting a gesture of a user of the electronic device, and determining whether the gesture is one of a preset gesture set, the preset gesture set configured for controlling the second window; and
- when it is determined that the gesture is one of the preset gesture set, generating the target blocked information; and
- wherein the determining the window display instruction based on the target blocked information comprises:
- determining, based on the gesture and a correspondence between the gesture and the window display instruction, wherein the window display instruction is one of a plurality of preset window display instructions.

19. The computer storage medium according to claim 15, wherein the computer instructions cause the electronic device further to perform:
- detecting a gesture of a user of the electronic device, and determining whether the gesture is one of a preset gesture set, the preset gesture set configured for controlling one or more function buttons in the first window;
- when the gesture is one of the preset gesture set, determining a button control instruction based on the gesture and a correspondence between the gesture in the preset gesture set and a function button; and
- controlling, according to the button control instruction, the function button in the first window to perform a corresponding function.

20. The computer storage medium according to claim 18, wherein detecting the gesture of the user comprises detecting at least one of: gesture duration information, gesture motion track information, and gesture shape information.

\* \* \* \* \*